(12) United States Patent
Clark

(10) Patent No.: US 12,727,967 B2
(45) Date of Patent: Sep. 8, 2026

(54) METHODS AND DEVICES FOR INTERPROXIMAL DENTAL RESTORATION

(71) Applicant: David J. Clark, Lakewood, WA (US)

(72) Inventor: David J. Clark, Lakewood, WA (US)

( * ) Notice: Subject to any disclaimer, the term of this patent is extended or adjusted under 35 U.S.C. 154(b) by 927 days.

(21) Appl. No.: 17/270,584

(22) PCT Filed: Aug. 23, 2019

(86) PCT No.: PCT/US2019/047935
§ 371 (c)(1),
(2) Date: Feb. 23, 2021

(87) PCT Pub. No.: WO2020/041718
PCT Pub. Date: Feb. 27, 2020

(65) Prior Publication Data

US 2021/0386515 A1 Dec. 16, 2021

Related U.S. Application Data

(60) Provisional application No. 62/793,732, filed on Jan. 17, 2019, provisional application No. 62/722,112, filed on Aug. 23, 2018.

(51) Int. Cl.
*A61C 5/20* (2017.01)
*A61C 3/00* (2006.01)
(Continued)

(52) U.S. Cl.
CPC ................. *A61C 5/20* (2017.02); *A61C 3/00* (2013.01); *A61C 5/85* (2017.02); *A61C 5/88* (2017.02)

(58) Field of Classification Search
CPC .... A61C 5/20; A61C 5/85; A61C 5/88; A61C 3/00
See application file for complete search history.

(56) References Cited

U.S. PATENT DOCUMENTS

| | | | |
|---|---|---|---|
| 647,956 | A | 4/1900 | Ford |
| 745,071 | A | 11/1903 | McKibben |

(Continued)

FOREIGN PATENT DOCUMENTS

| | | |
|---|---|---|
| WO | 2012064750 | 5/2012 |
| WO | 2015187927 | 12/2015 |
| WO | 2016183360 | 11/2016 |

OTHER PUBLICATIONS

International Searching Authority. International Search Report and Written Opinion for application PCT/US2019/047935. Mailed on Dec. 19, 2019. 17 pages.

(Continued)

*Primary Examiner* — Eric J Rosen
*Assistant Examiner* — Hao D Mai
(74) *Attorney, Agent, or Firm* — Quarles & Brady LLP

(57) ABSTRACT

Methods and devices for interproximal dental restoration are disclosed. One version of the present disclosure provides a method for the restoration of a tooth including a top surface, and an interproximal surface facing an adjacent tooth. The method of restoration includes removing a portion of the top surface of the tooth, and a portion of the interproximal surface of the tooth to form a hollow cavity preparation extending from the top surface to the interproximal surface. The removed portion of the interproximal space is surrounded by a dental matrix. Restoration of the tooth further includes moving the dental matrix away from the hollow cavity preparation towards the adjacent tooth, and bonding at least a section of the dental matrix to the tooth. Light-curable composite resin is then injected into the cavity preparation and light cured.

35 Claims, 21 Drawing Sheets

(51) Int. Cl.
*A61C 5/85* (2017.01)
*A61C 5/88* (2017.01)

(56) References Cited

U.S. PATENT DOCUMENTS

| | | | | |
|---|---|---|---|---|
| 1,233,770 | A | 7/1917 | Farrow | |
| 1,386,436 | A | 8/1921 | Smith | |
| 1,518,021 | A | 12/1924 | Truxillo | |
| 1,626,226 | A | 4/1927 | Osias | |
| 1,814,044 | A | 7/1931 | Joffe | |
| 3,972,333 | A | 8/1976 | Leveen | |
| 4,001,940 | A | 1/1977 | Cusato | |
| 4,303,268 | A | 12/1981 | Davidson | |
| 4,461,297 | A | 7/1984 | Sutter | |
| 4,608,021 | A | 8/1986 | Barrett | |
| 4,704,087 | A * | 11/1987 | Dragan | A61C 5/85 433/39 |
| 4,760,848 | A | 8/1988 | Hasson | |
| 4,987,634 | A | 1/1991 | Weihrauch | |
| 5,318,446 | A * | 6/1994 | Slone | A61C 5/85 433/149 |
| 5,385,471 | A | 1/1995 | Chuen | |
| 6,234,793 | B1 * | 5/2001 | Brattesani | A61C 5/85 433/149 |
| 6,248,123 | B1 | 6/2001 | McDonald | |
| 6,471,515 | B2 | 10/2002 | Feuer | |
| 8,272,869 | B2 | 9/2012 | Galler | |
| 8,979,531 | B2 | 3/2015 | Mueller | |
| 9,308,058 | B2 | 4/2016 | Clark | |
| 2004/0146838 | A1 | 7/2004 | Nugiel | |
| 2004/0229191 | A1 | 11/2004 | Dietrich | |
| 2005/0125013 | A1 | 6/2005 | Kessler | |
| 2008/0064002 | A1 | 3/2008 | Clark | |
| 2008/0064004 | A1 | 3/2008 | Clark | |
| 2008/0064012 | A1 * | 3/2008 | Clark | A61C 5/85 433/226 |
| 2009/0191505 | A1 * | 7/2009 | Clark | A61C 5/50 433/226 |
| 2009/0208896 | A1 | 8/2009 | Clark | |
| 2014/0038130 | A1 | 2/2014 | Pun | |
| 2015/0182302 | A1 | 7/2015 | McDonald | |
| 2017/0055960 | A1 | 3/2017 | Kattine | |
| 2019/0201165 | A1 * | 7/2019 | Mishaeloff | A61C 5/20 |

OTHER PUBLICATIONS

Office Action in Canadian Application No. 3,110,514.

* cited by examiner 508
520
518

100b
508
510
514
512
504
516
502
506

606
604
602
624

614
612
618

602
604

608
612
610
620
618
622
100c 1006
1020
1002
1004
1018
1008
1012
1014
1010
100g
1016

2022
1024

5006
5020
5004
5002
5008
5012
5010
5014
5018
5016

5006
5020
5004
5002
5012
100k
5016

6006
6008
6002
6004
1001
6014
6010
6012

6016
6018
6020

METHODS AND DEVICES FOR INTERPROXIMAL DENTAL RESTORATION

CROSS-REFERENCES TO RELATED APPLICATIONS

This application is a national stage application, filed under 35 U.S.C. § 371 of International Patent Application No. PCT/US2019/047935, filed Aug. 23, 2019 and is related to and claims priority to U.S. Provisional Patent Application No. 62/722,112, filed Aug. 23, 2018 and U.S. Provisional Patent Application No. 62/793,732, filed Jan. 17, 2019, each of which are incorporated herein by reference.

STATEMENT REGARDING FEDERALLY SPONSORED RESEARCH

Not Applicable.

BACKGROUND OF THE INVENTION

1. Field of the Invention

This invention relates to methods and devices for interproximal dental restoration.

2. Description of the Related Art

Dental cavities that have spread to the dentin or have undergone cavitation are typically treated by removing the decayed portion of the tooth and thereafter filling the missing tooth structure with a restorative material such as silver (amalgam), white (resin), porcelain, or gold. Cavities that are located adjacent to neighboring teeth are called interproximal cavities.

When treating interproximal cavities, the dentist first removes the decayed portion of the side of the tooth. In order to properly deposit the restorative material on the side of the tooth without undesired leaking of the restorative material beyond the side of the tooth, the dentist places a dental matrix around at least a portion of the tooth. The dental matrix may be a metallic or plastic strip, and when the matrix is placed around at least a portion of the tooth, the matrix acts as a form for the desired shape of the restored tooth.

The Bioclear® brand matrix (available at http://www.bioclearmatrix.com) has advanced, among other things, interproximal dental restoration with an injection molding process. See U.S. Pat. No. 9,308,058.

Even with the advancements provided in U.S. Pat. No. 9,308,058, there is still a need for further advancement in methods and devices for interproximal dental restoration. In particular, there is a need for methods and devices for interproximal dental restoration that result in even better posterior composite filling contacts.

SUMMARY OF THE INVENTION

The present disclosure provides a method for the restoration of a tooth including a top surface, and an interproximal surface facing an adjacent tooth. The method of restoration includes removing a portion of the top surface of the tooth, and a portion of the interproximal surface of the tooth to form a hollow cavity preparation extending from the top surface to the interproximal surface. The removed portion of the interproximal space is surrounded by a dental matrix. Restoration of the tooth further includes moving the dental matrix away from the hollow cavity preparation towards the adjacent tooth, and bonding at least a section of the dental matrix to the tooth. Light-curable composite resin is then injected into the cavity preparation and light cured.

A method is disclosed herein for the restoration of a first tooth having an original shape including a top surface and an interproximal surface facing an adjacent second tooth. The method can comprise removing a portion of the top surface of the first tooth and a portion of the interproximal surface of the first tooth to form a hollow cavity preparation. The cavity preparation can extend from the top surface to the interproximal surface of the first tooth. The method can further include surrounding the removed portion of the interproximal surface of the first tooth with a matrix. The method can then include moving the matrix away from the hollow cavity preparation toward the second tooth, and bonding a section of the matrix to the first tooth. The method can also bond a second of the matrix to the first tooth using a cured amount of composite resin. The steps of moving the matrix away from the hollow cavity preparation and bonding a section of the matrix to the first tooth can occur in the opposite order. For example, the section of the matrix could be bonded to the tooth first, and then the matrix can be moved away from the hollow cavity preparation towards the second tooth.

The method can also include injecting a light-curable composite resin into the cavity preparation, light curing the composite resin contained in the cavity preparation, and placing a light-curable resin tooth bonding agent into the cavity preparation before injecting the light-curable composite resin into the cavity preparation. The method can also comprise extruding a light-curable paste composite resin into the composite resin. The composite resin can be added after this step such that the method produces a single cured layer of composite resin. The cured layer of composite resin can be seamless.

The method can also include a pre-wedging step including inserting a wedge pre-operatively between the interproximal surface of the first tooth and an interproximal surface of the second tooth. The method can also include moving the matrix away from the hollow cavity preparation toward the second tooth using a dental tool and then moving the matrix away from the hollow cavity preparation toward the second tooth until the matrix contacts the second tooth. The dental tool may be any dental tool described herein. The method can further include bonding a second section of the matrix to the first tooth, and bonding a third section of the matrix to the first tooth. The third section of the matrix can be on an interproximal side of the first tooth when the matrix surrounds the removed portion of the interproximal surface. The method can further comprise moving the matrix away from the hollow cavity preparation toward the second tooth using a dental tool. The dental tool may be any dental tool described herein. The method can also include a pre-wedging step including inserting a wedge pre-operatively between the interproximal surface of the first tooth and an interproximal surface of the second tooth.

The section of the matrix can comprise a first tab extending away from an edge of the matrix. The second section of the matrix can comprise a second tab extending away from the edge of the matrix. The first tab can be on a lingual side of the first tooth when the matrix surrounds the removed portion of the interproximal surface.

In another embodiment, a dental matrix can comprise a curved strip of translucent material. The strip can have a length from a first edge to a second edge sufficient to create a form for molding a restorative material to a surface of a tooth to be restored. The strip can have a width from a top edge to a bottom edge. The strip can also a tab intermediate the first edge and the second edge. The strip can also have an inwardly directed cutaway located between the tab and the first edge. The strip can have another inwardly directed cutaway located between the tab and the second edge. The dentil matrix can have a thickness between a range of 50 micrometers to 100 micrometers. The cutaway can have a keyway shape. The cutaway can also have a rectangular shape.

In another embodiment of the present disclosure, a dental matrix can comprise a curved strip of translucent material. The strip can have a length from a first edge to a second edge sufficient to create a form for molding a restorative material to a surface of a tooth to be restored. The strip can also have a width from a top edge to a bottom edge. The top edge and the first edge can be joined at an inwardly directed cutaway. The top edge and the second edge can be joined at an inwardly directed cutaway. The strip can have a tab intermediate the first edge and the second edge. The dentil matrix can have a thickness between a range of 50 micrometers to 100 micrometers. The cutaway can have a keyway shape, and the cutaway can have a rectangular shape.

In another embodiment, a method for the restoration of a first tooth can have an original shape including a top surface and an interproximal surface facing an adjacent second tooth. The method can comprise removing a portion of the top surface of the first tooth and a portion of the interproximal surface of the first tooth to form a hollow cavity preparation. The cavity preparation can extend from the top surface to the interproximal surface of the first tooth. The method can further include surrounding the removed portion of the interproximal surface of the first tooth with a matrix. The matrix can include a cutaway. The method can also include moving the matrix away from the hollow cavity preparation toward the second tooth. The method can include bonding a section of the matrix at the cutaway to the first tooth, injecting a light-curable composite resin into the cavity preparation, and light curing the composite resin contained in the cavity preparation. The composite resin cannot be added after the previous step such that the method produces a single cured layer of composite resin. The method can also include placing a light-curable resin tooth bonding agent into the cavity preparation before injecting the light-curable composite resin into the cavity preparation and extruding a light-curable paste composite resin into the composite resin. The method can also be performed with a pre-wedging step including inserting a wedge pre-operatively between the interproximal surface of the first tooth and an interproximal surface of the second tooth.

The method can also comprise moving the matrix away from the hollow cavity preparation toward the second tooth using a dental tool and moving the matrix away from the hollow cavity preparation toward the second tooth until the matrix contacts the second tooth. The method can further include bonding a second section of the matrix at the cutaway to the first tooth. The method can include moving the matrix away from the hollow cavity preparation toward the second tooth using a dental tool and moving the matrix away from the hollow cavity preparation toward the second tooth using a dental tool. The method can further comprise bonding a section of the matrix to the first tooth using a cured amount of composite resin.

The steps of the method can also be performed in different orders. For example the step of bonding a section of the matrix at the cutaway to the first tooth can be performed before the step of moving the matrix away from the hollow cavity preparation toward the second tooth.

The first section of the matrix can comprise a first flange extending away from a first side edge of the matrix. The second section of the matrix can comprise a second flange extending away from a second side edge of the matrix. The first flange can be on a lingual side of the first tooth when the matrix surrounds the removed portion of the interproximal surface. The second flange can be on a buccal side of the first tooth when the matrix surrounds the removed portion of the interproximal surface. The cured layer of composite resin can be seamless.

In another embodiment of the present disclosure, a dental tool can comprise a first arm and an opposed second arm connected at a proximal end of the first arm and the second arm. The first arm can terminate in a first distal tooth, and the second arm can terminate in a second distal tooth. An adjustment mechanism can hold the first distal tooth and the second distal tooth in at least a first spaced relationship and a second spaced relationship different from the first spaced relationship.

As an example, the adjustment mechanism can comprise a slider configured to move forwards and backwards. The slider can be held at a desired position by a textured surface on the first arm and the second arm. Specifically, the slider can be held at a first location to hold the first spaced relationship. The slider can also be held at a second location to hold the second spaced relationship.

As another example, the adjustment mechanism can comprise a slider configured to move forwards and backwards. The slider can be held at a desired position by a notch on a side of the first arm and the second arm. Specifically, the slider can be held at a first location to hold the first spaced relationship. The slider can also be held at a second location to hold the second spaced relationship.

As another example, the adjustment mechanism can comprise a middle section of the dental tool connected to a wedge by a threaded aperture. The wedge can be located between the first arm and the second arm. Rotating the middle section in a first direction can hold the first tooth and the second tooth at a first spaced relationship. Rotating the middle section in a second direction can hold the first tooth and the second tooth at a second spaced relationship.

As another example, the adjustment mechanism can comprise an elastic (e.g., silicone) ring and a plurality of notches. The ring can be placed in one of the plurality of notches to hold the first spaced relationship. The ring can also be placed in another one of the plurality of notches to hold the second spaced relationship.

As another example, the adjustment mechanism can comprise a slider having an extending arm. The slider can be configured to move forwards and backwards. The slider can be held at a desired position by coupling the arm to one of a plurality of grooves on the first arm and the second arm. The slider can be held at one of the plurality of grooves to hold the first spaced relationship. The slider can also be held at another of the plurality of grooves to hold the second spaced relationship.

As another example, the adjustment mechanism can comprise a knurled knob. The knob can be configured to move forwards and backwards. The knob can be held at a desired position by coupling the knob to one of a plurality of grooves on the first arm and the second arm. The knob can be held at one of the plurality of grooves to hold the first spaced relationship. The knob can be held at another of the plurality of grooves to hold the second spaced relationship.

As another example, the adjustment mechanism can comprise a slider coupled to a ratchet strap. The slider can be held at one of a plurality of notches within the dental tool to hold the first spaced relationship. The slider can also be held at another of a plurality of notches within the dental tool to hold the second spaced relationship.

As another example, the adjustment mechanism can comprise a slider having a textured top surface. The slider can be configured to be inserted into a notch along a side of the dental tool. The slider can be held at a first position along the notch to hold the first spaced relationship. The slider can be held at a second position along the notch to hold the second spaced relationship.

As another example, the adjustment mechanism can comprise a rotating knob coupled to an internal section of the dental tool. The knob can be rotated in a first direction to hold the first spaced relationship. The knob can also be rotated in a second direction to hold the second spaced relationship.

As another example, the adjustment mechanism can comprise a knurled middle section coupled to a threaded insert at a proximal end and can be coupled to the first and second arms at the distal end. The middle section can be rotated in a first direction to hold the first spaced relationship. The middle section can be rotated in a second direction to hold the second spaced relationship.

In another embodiment of the present disclosure, a dental tool can comprise a first arm and an opposed second arm connected at a proximal end of the first arm and the second arm wherein the first arm terminates in a first distal tooth, and the second arm terminates in a second distal tooth. A biasing spring is coupled to the first arm and the second arm. The biasing spring has a first position in which the first distal tooth and the second distal tooth are in a first spaced relationship, and the biasing spring has a second position in which the first distal tooth and the second distal tooth are in a second spaced relationship different from the first spaced relationship.

It is one advantage of the present disclosure to provide a dental tool for pushing a dental matrix that is positioned on a first tooth toward an adjacent second tooth to eliminate any interproximal space between the adjacent second tooth and the dental matrix.

It is another advantage of the present disclosure to provide a dental tool for pulling a dental matrix that is positioned on a first tooth toward an adjacent second tooth to eliminate any interproximal space between the adjacent second tooth and the dental matrix.

It is another advantage of the present disclosure to provide an adjustable dental tool that can be narrow in size for placement in smaller cavity preparations.

It is another advantage of the present disclosure to provide an adjustable dental tool that can be wider in size for placement in larger cavity preparations.

It is another advantage of the present disclosure to provide a light-cured composite resin layer that is seamless and has good contact between teeth.

These and other features, aspects, and advantages of the present invention will become better understood upon consideration of the following detailed description, drawings and appended claims.

FIG. **16*a*** is a top perspective view of another embodiment of a dental tool of the present disclosure.

Figures 16A, 16B:
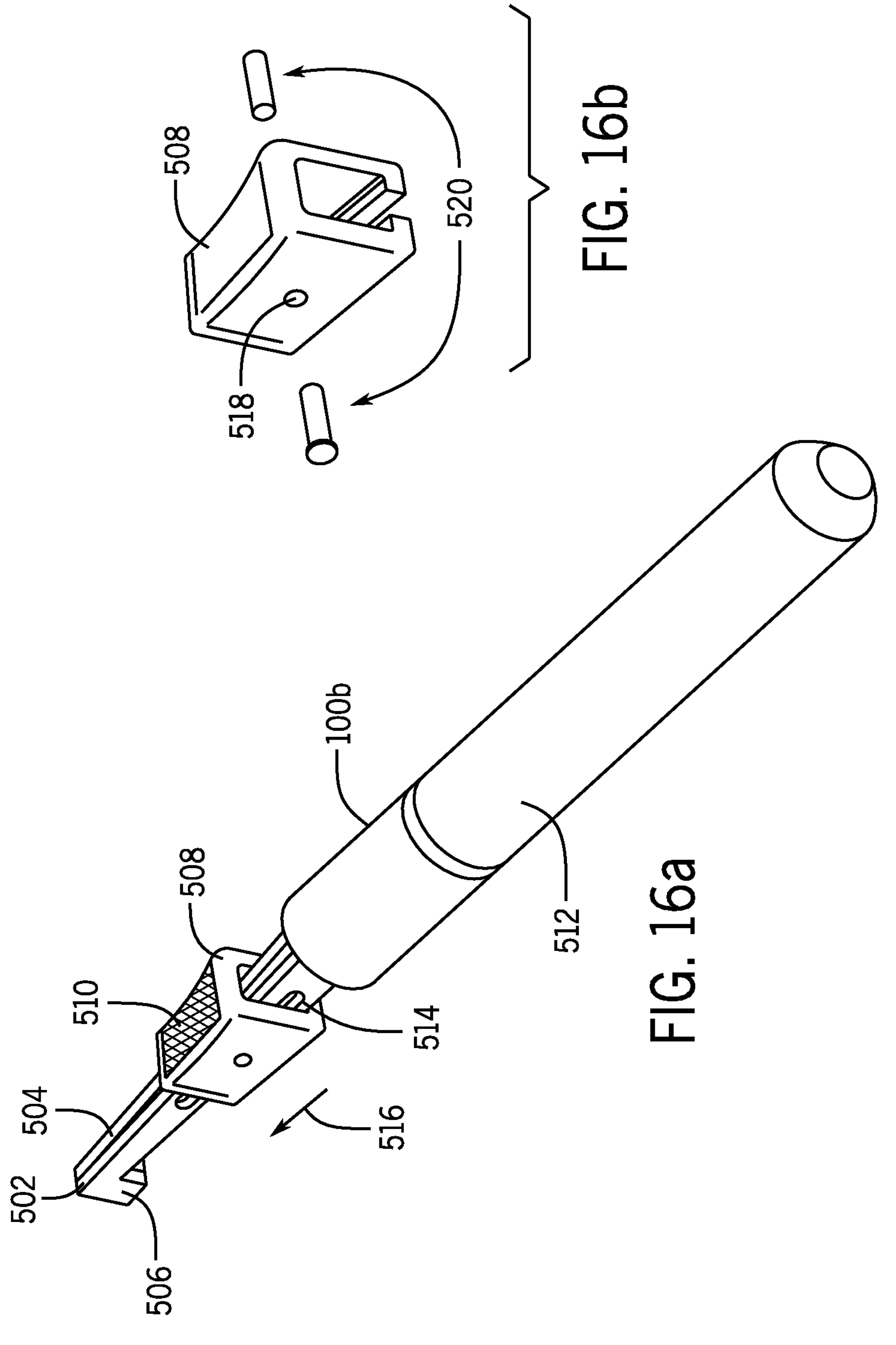

FIG. **16*b* is an exploded top perspective view of an adjustment slider of the dental tool of FIG. 16*a***.

FIG. **17*a*** is a top perspective view of another embodiment of a dental tool of the present disclosure.

Figures 17A, 17B, 17C, 17D:
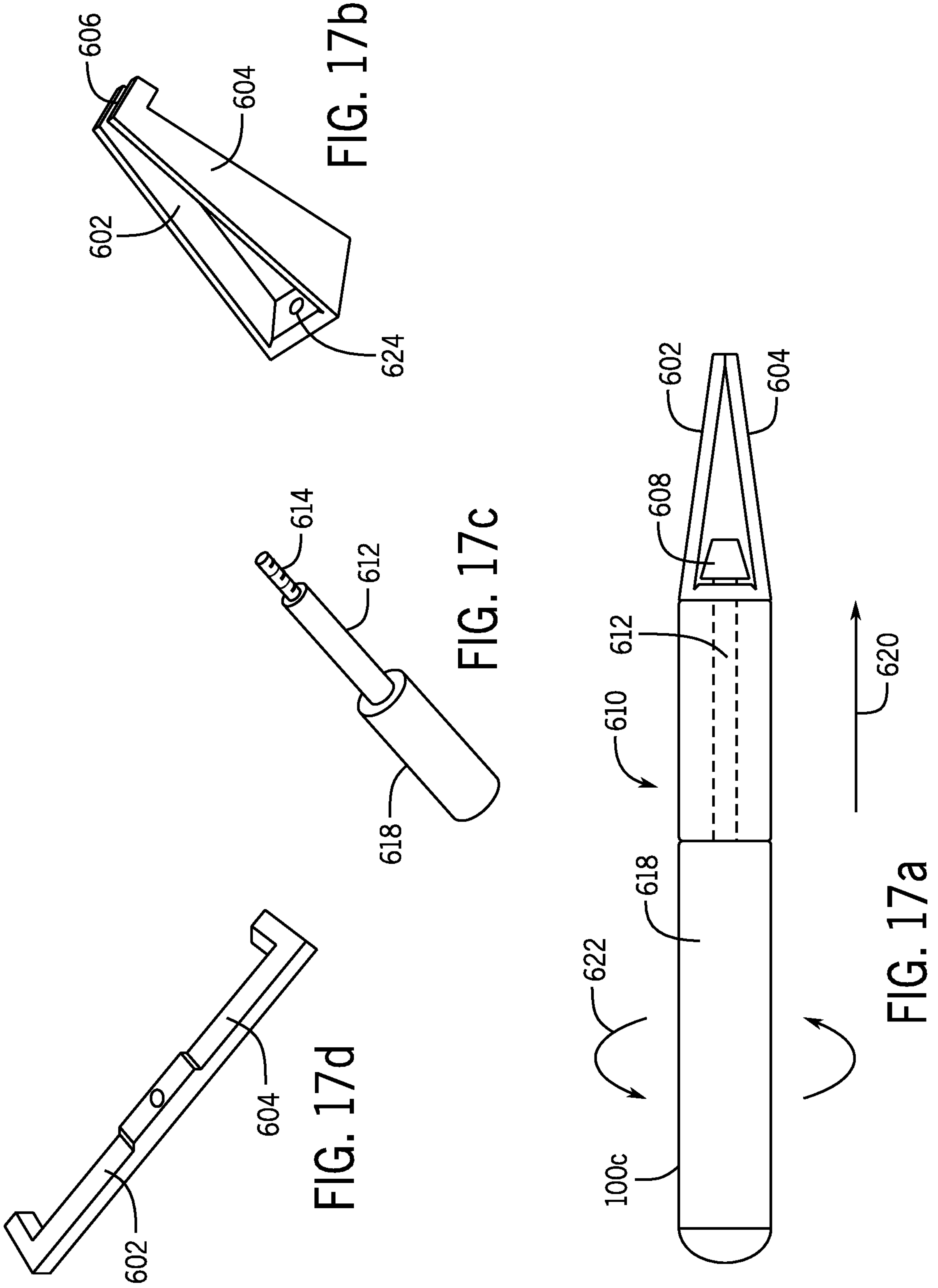

FIG. **17*b* is a top perspective view of a component of an adjustment mechanism of the dental tool of FIG. 17*a***.

FIG. **17*c* is a top perspective view of a component of an adjustment mechanism of the dental tool of FIG. 17*a***.

FIG. **17*d* is a top perspective view of a component of an adjustment mechanism of the dental tool of FIG. 17*a***.

FIG. **18*a*** is a top perspective view of another embodiment of a dental tool of the present disclosure.

Figures 18A, 18B:
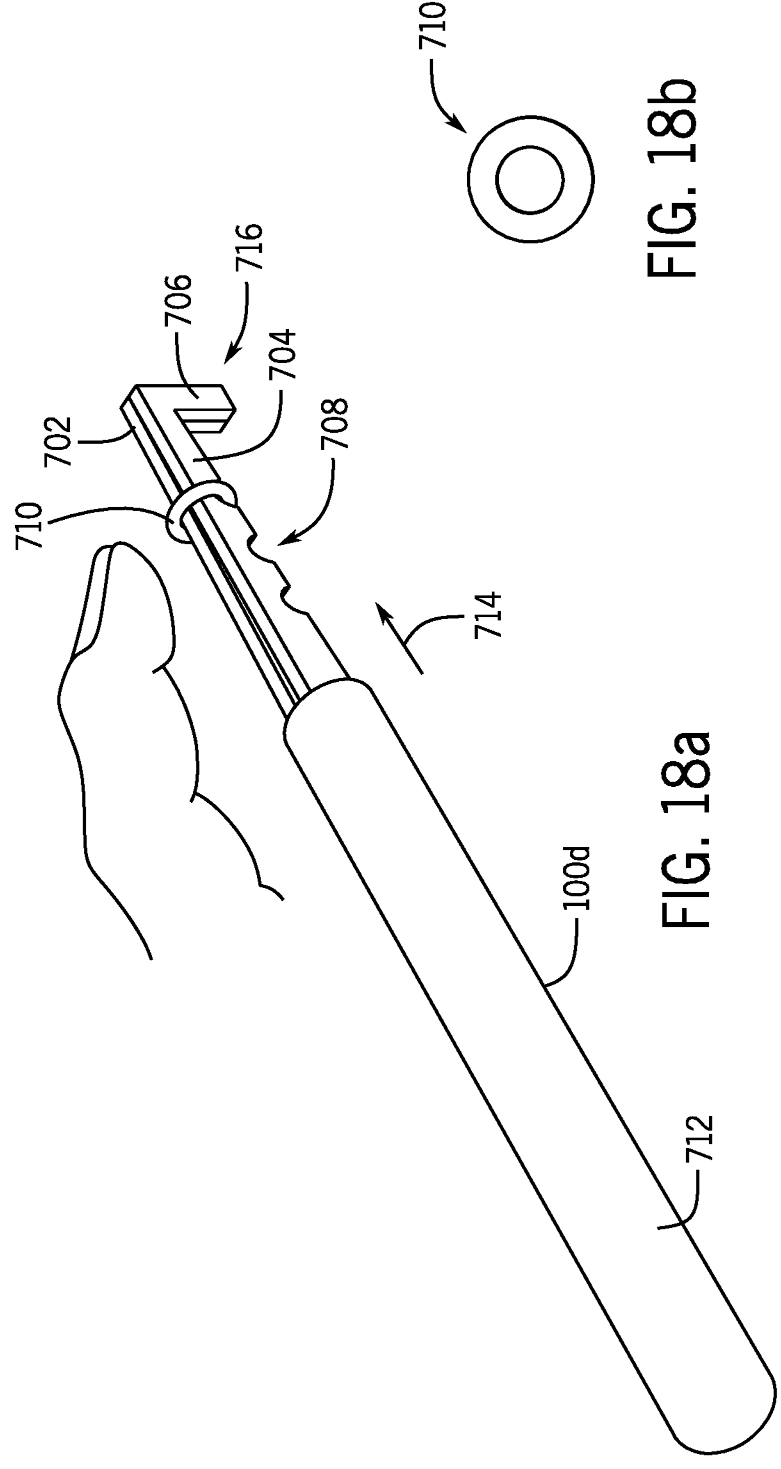

FIG. **18*b* is a top view of a component of an adjustment mechanism of the dental tool of FIG. 18*a***.

Figure 19:
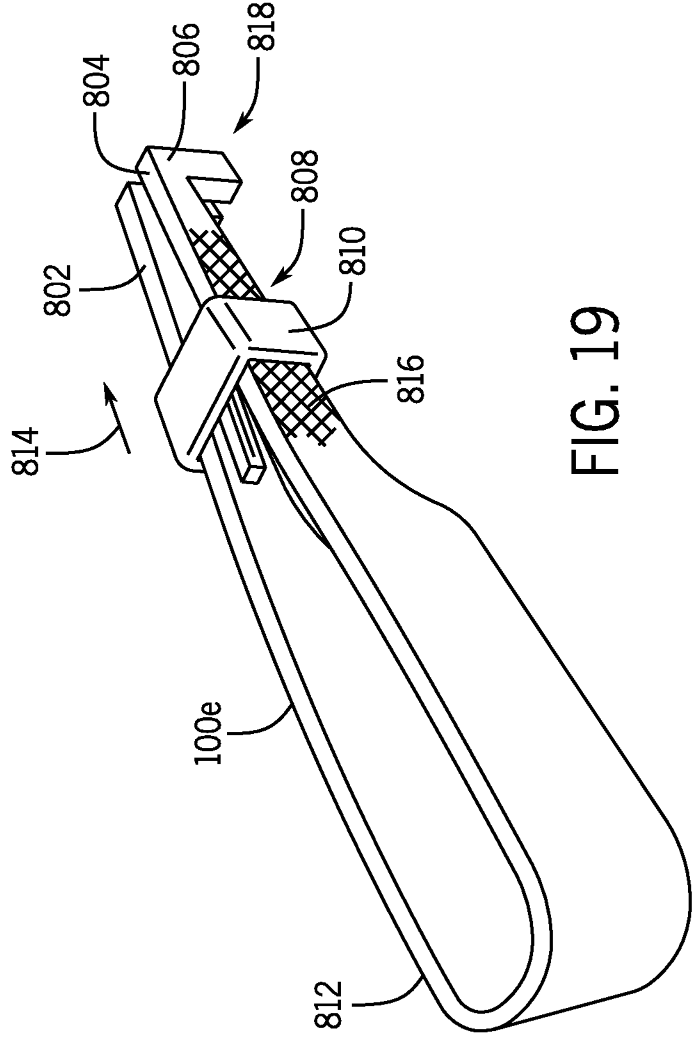

FIG. 19 is a top perspective view of another embodiment of a dental tool of the present disclosure.

FIG. **20*a*** is a top perspective view of another embodiment of a dental tool of the present disclosure.

Figures 20A, 20B:
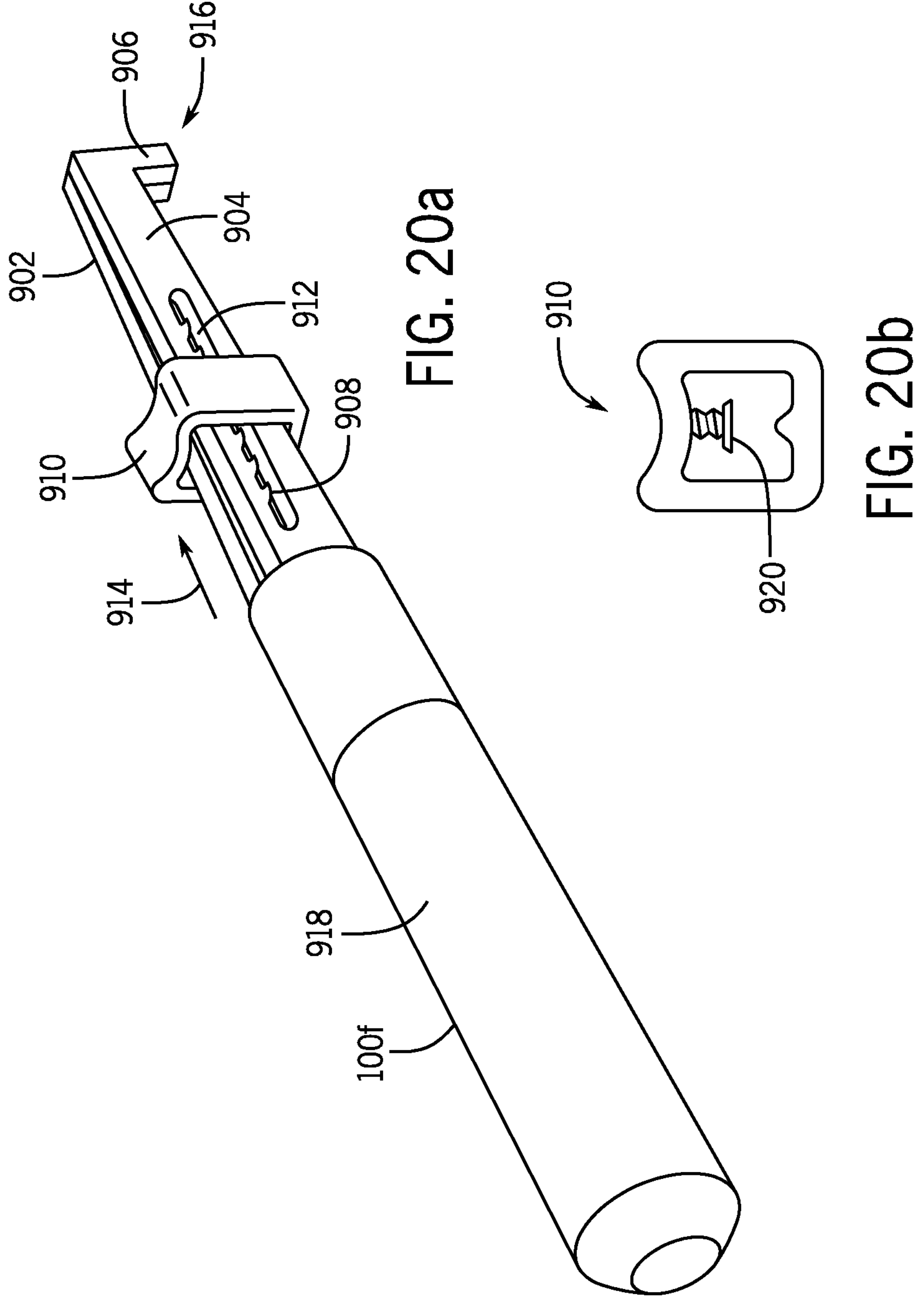

FIG. **20*b* is a top view of a component of an adjustment mechanism of the dental tool of FIG. 20*a***.

FIG. **21*a*** is a top perspective view of another embodiment of a dental tool of the present disclosure.

Figures 21A, 21B:
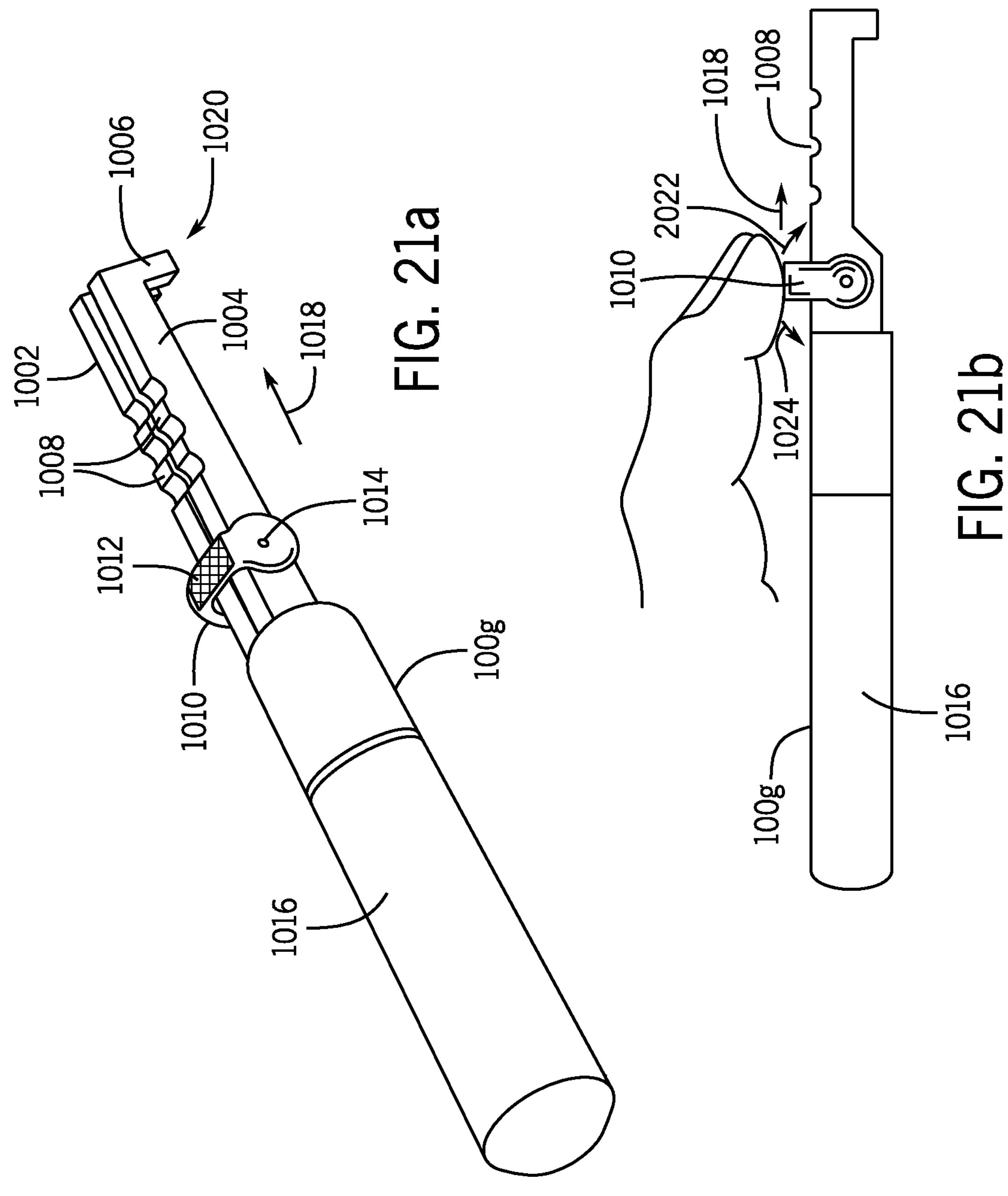

FIG. **21*b* is a side view of the dental tool of FIG. 21*a***.

FIG. **22*a*** is a top perspective view of another embodiment of a dental tool of the present disclosure.

Figures 22A, 22B:
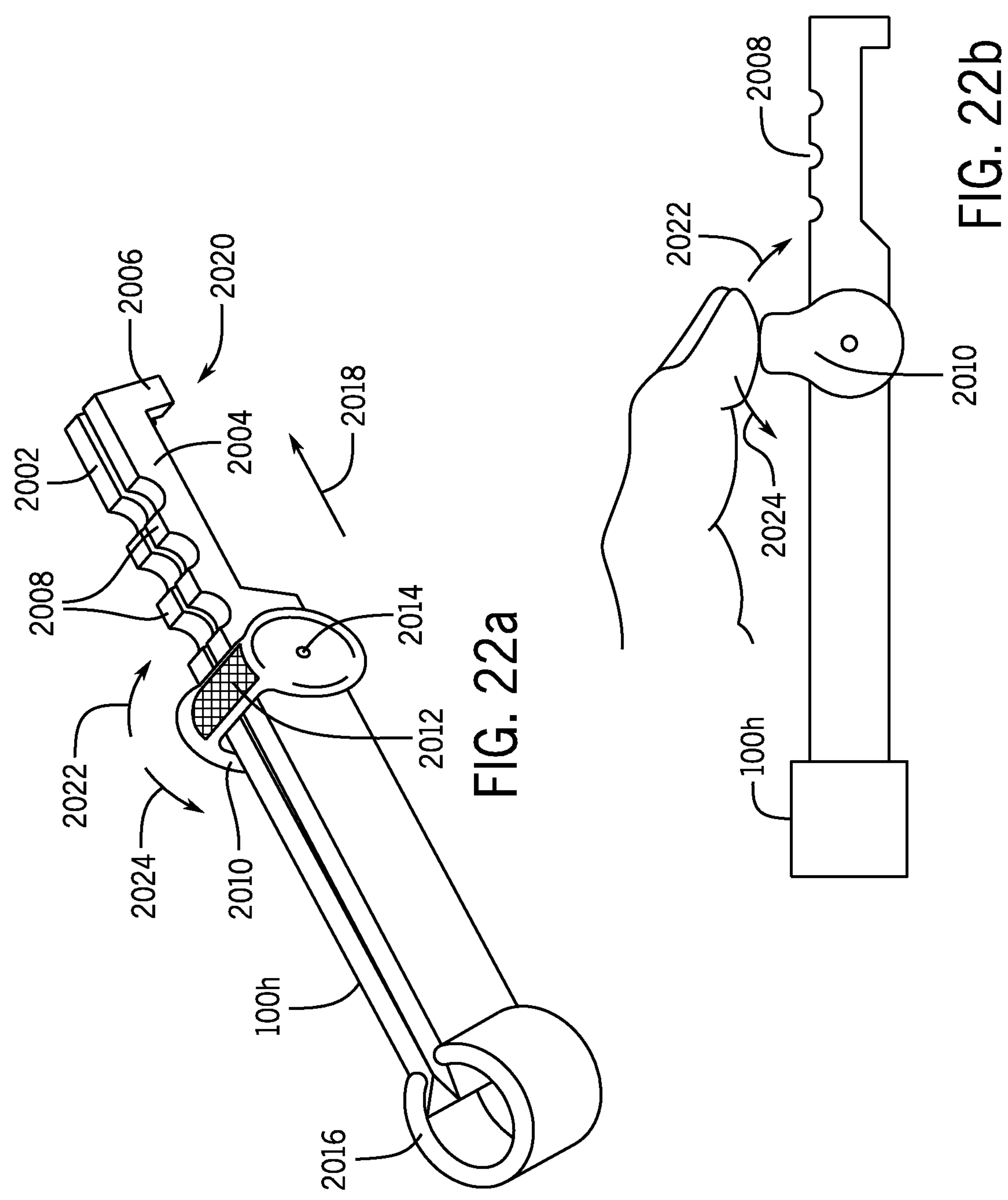

FIG. **22*b* is a side view of the dental tool of FIG. 22*a***.

Figures 23A, 23B, 23C, 23D:
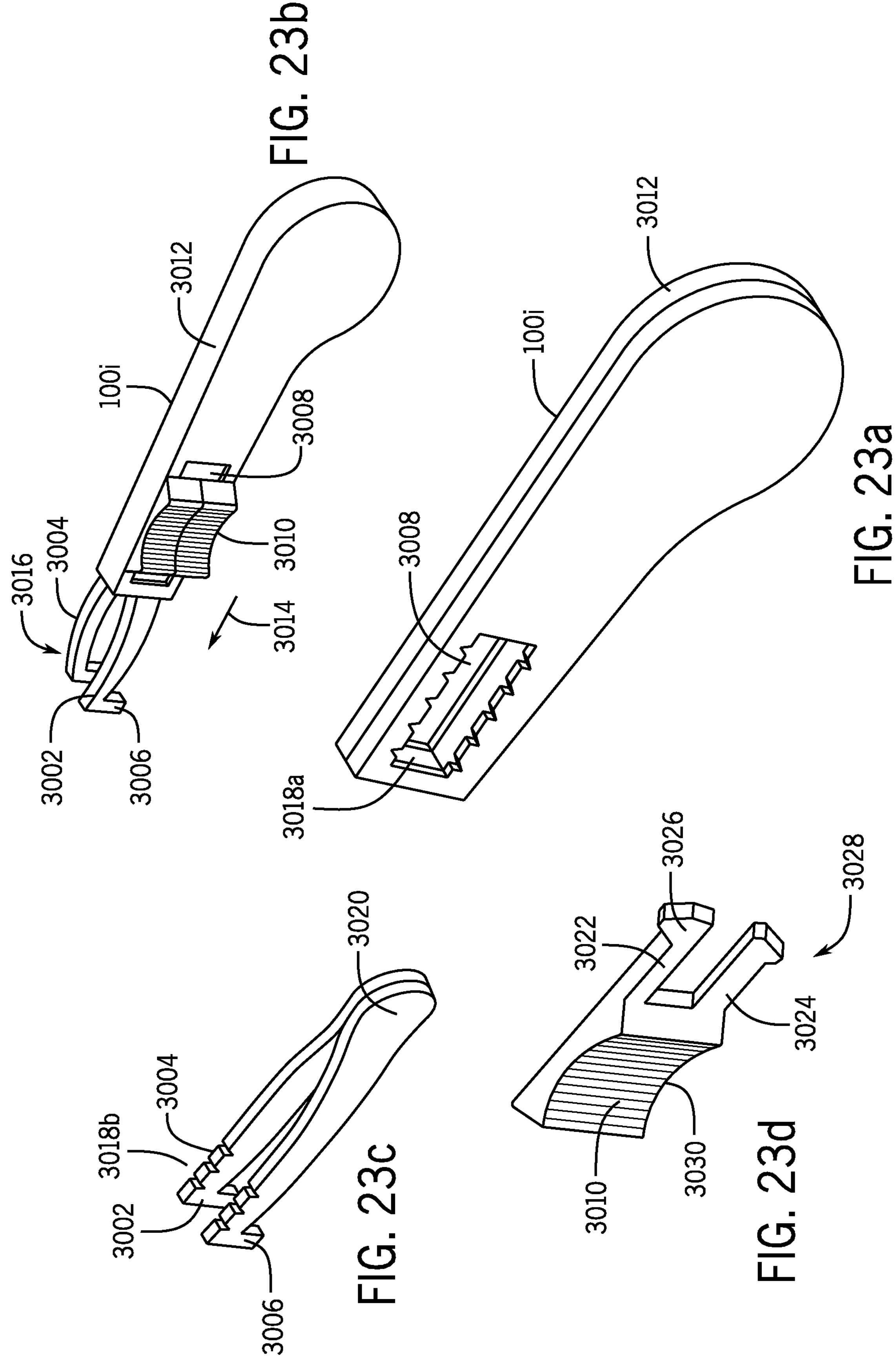

FIG. **23*a* is a top perspective view of a component of an adjustment mechanism of the dental tool of FIG. 23*b***.

FIG. 23*b* is a top perspective view of another embodiment of a dental tool of the present disclosure.

FIG. 23*c* is a top perspective view of a component of an adjustment mechanism of the dental tool of FIG. 23*b*.

FIG. 23*d* is a top perspective view of a component of an adjustment mechanism of the dental tool of FIG. 23*b*.

Figures 24A, 24B:
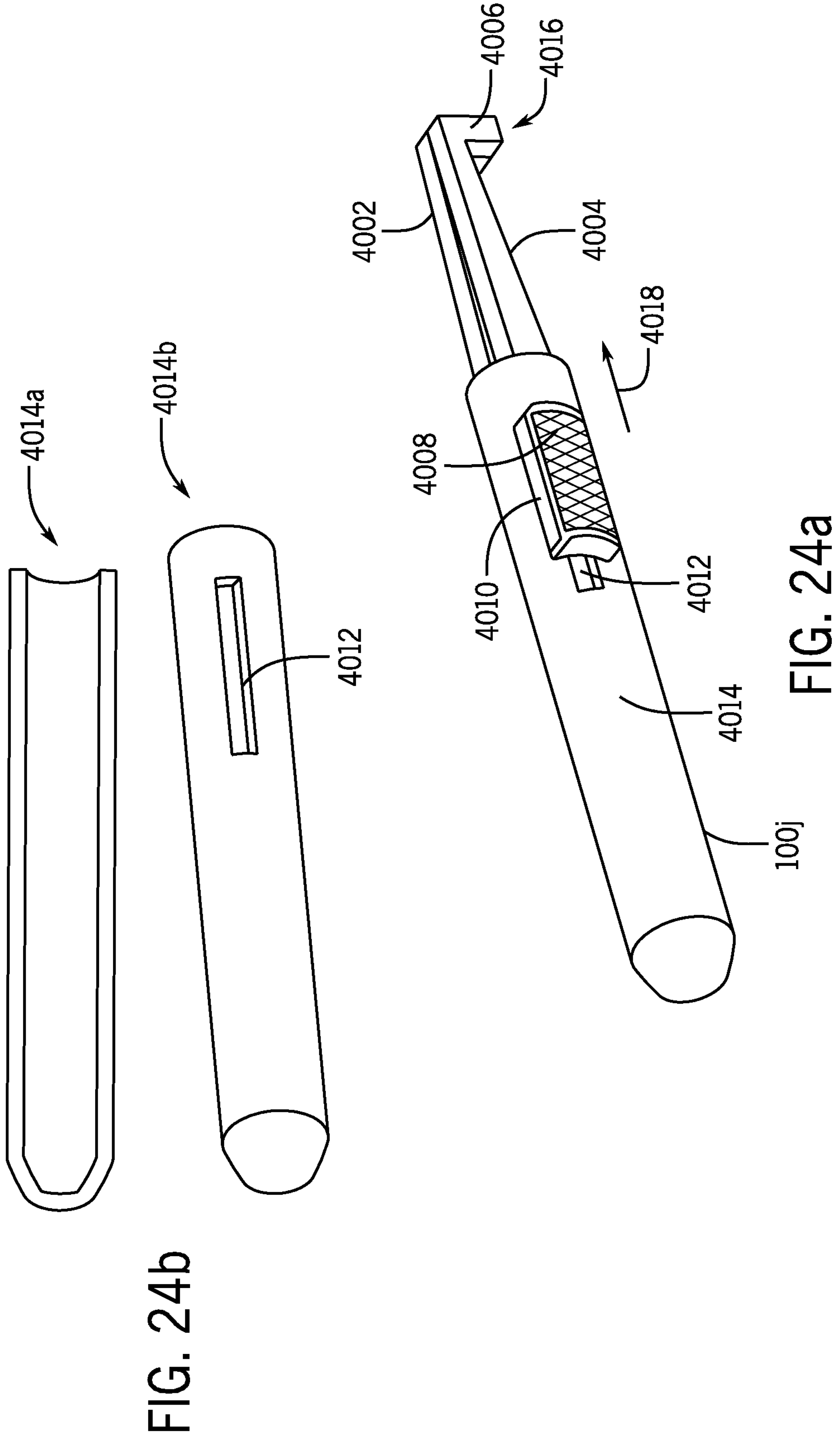

FIG. 24*a* is a top perspective view of another embodiment of a dental tool of the present disclosure.

FIG. 24*b* is a top exploded perspective view of an end of the dental tool of FIG. 24*b*.

Figures 25A, 25B:
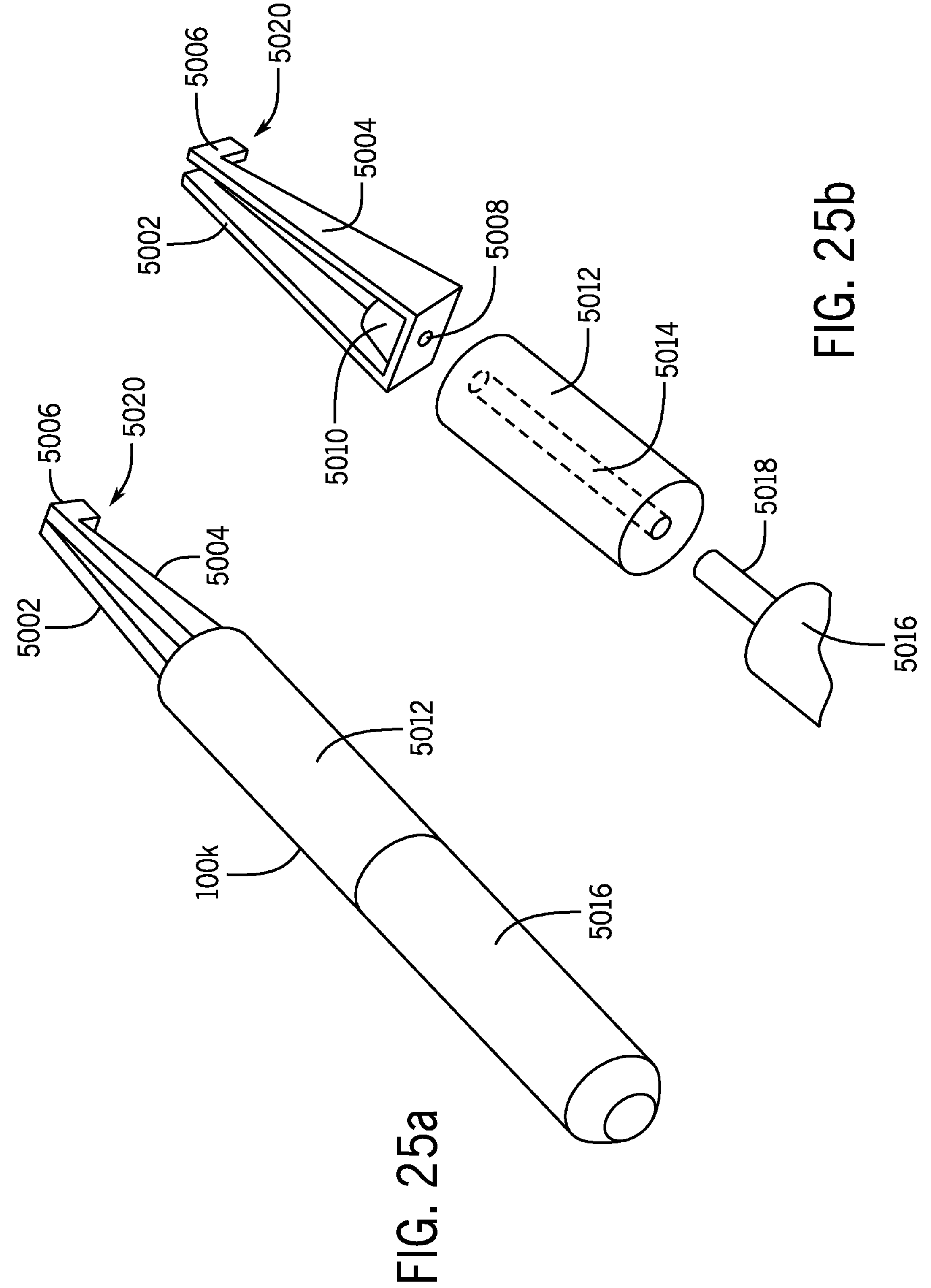

FIG. 25*a* is a top perspective view of another embodiment of a dental tool of the present disclosure.

FIG. 25*b* is a top perspective partial exploded view of components of an adjustment mechanism of the dental tool of FIG. 25*a*.

Figures 26A, 26B:
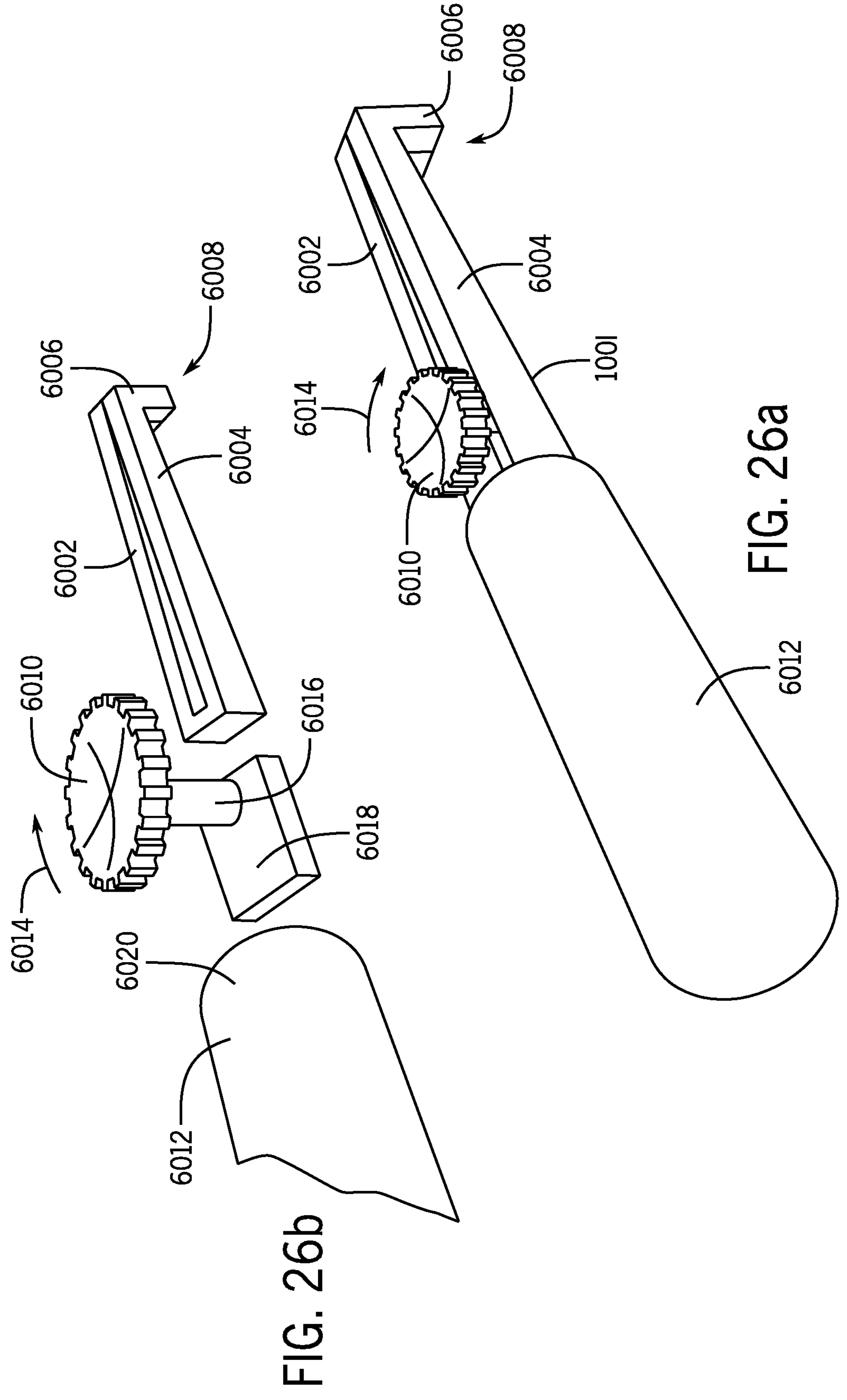

FIG. 26*a* is a top perspective view of another embodiment of a dental tool of the present disclosure.

FIG. 26*b* is a top perspective partial exploded view of components of an adjustment mechanism of the dental tool of FIG. 26*a*.

Figures 27A, 27B:
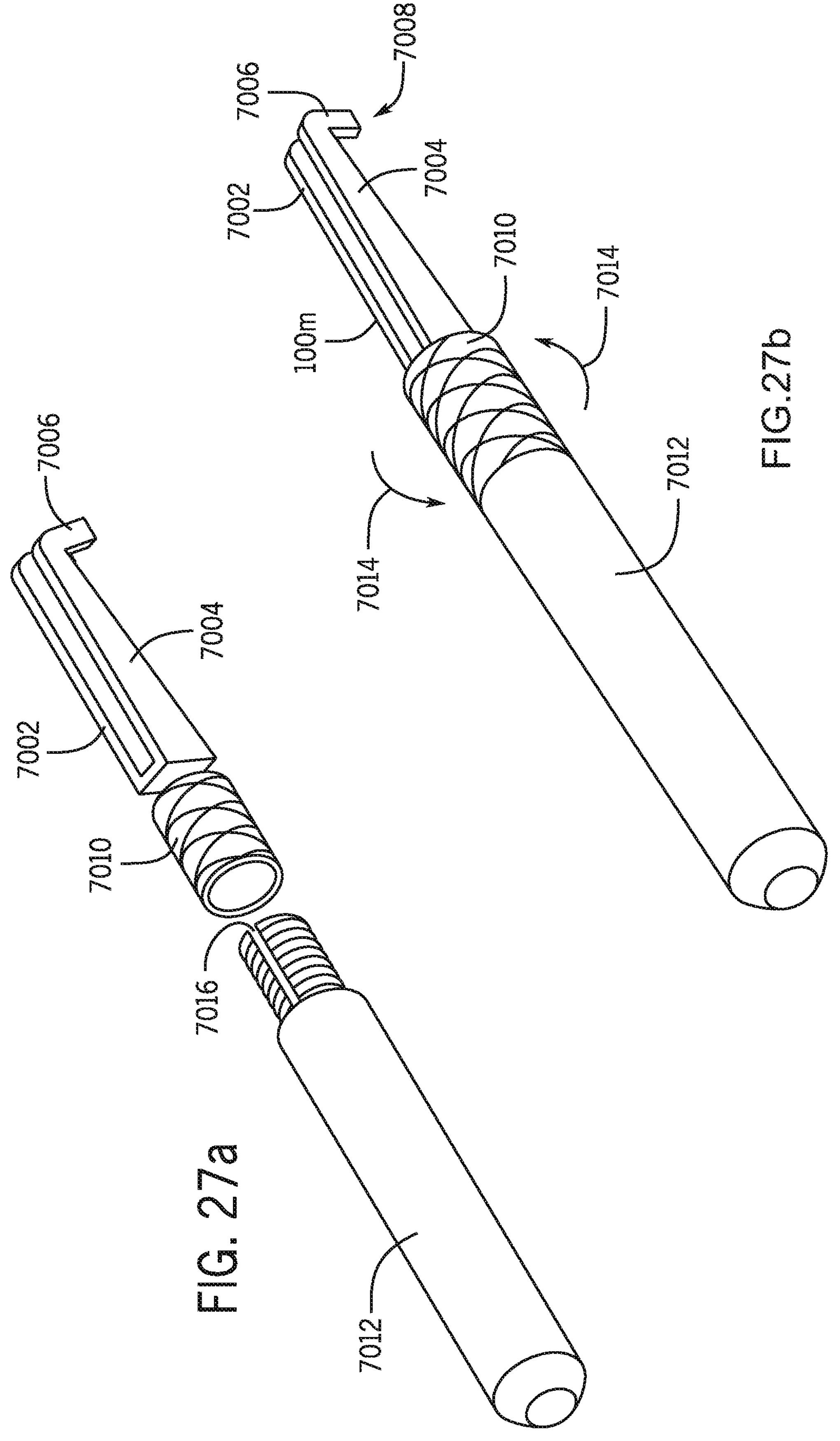

FIG. 27*a* is a top perspective view of another embodiment of a dental tool of the present disclosure.

FIG. 27*b* is a top perspective partial exploded view of components of an adjustment mechanism of the dental tool of FIG. 27*a*.

Like reference numerals will be used to refer to like parts from Figure to Figure in the following description of the drawings.

DETAILED DESCRIPTION OF THE INVENTION

The present invention provides a method for the restoration of a tooth including a top surface, and an interproximal surface facing an adjacent tooth. The method of restoration includes removing a portion of the top surface of the tooth, and a portion of the interproximal surface of the tooth to form a hollow cavity preparation extending from the top surface to the interproximal surface. The removed portion of the interproximal space is surrounded by a dental matrix. Restoration of the tooth further includes moving the dental matrix away from the hollow cavity preparation towards the adjacent tooth, and bonding at least one section of the dental matrix to the tooth. Light-curable composite resin is injected into the cavity preparation and light cured.

Figure 1:
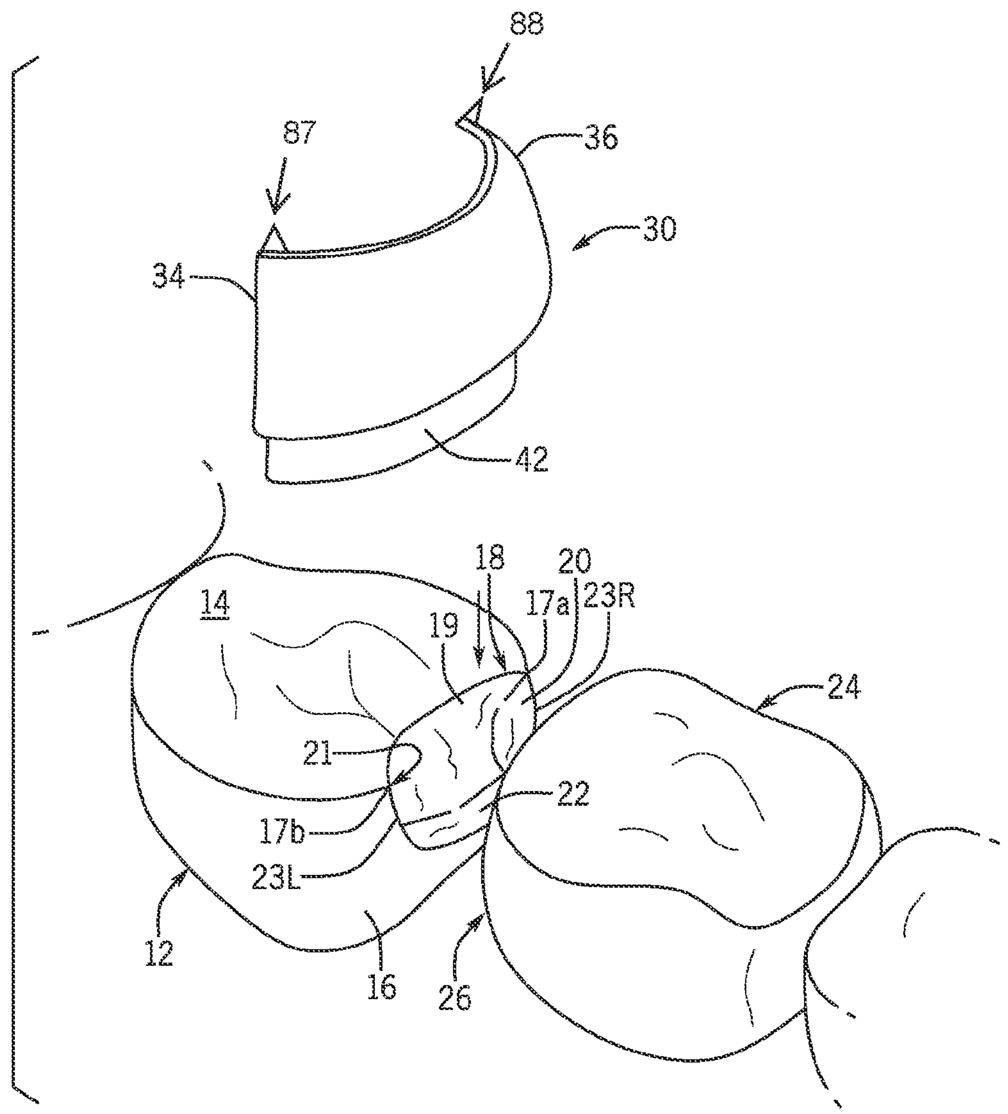
FIG. 1 is a top perspective view of a matrix insertion step of the method of the present disclosure.

Turning to FIGS. 1-5, there is shown various steps and devices in an example method according to the invention for restoration of a tooth. In a first step, the dentist locates a first tooth having a cavity. Referring to FIG. 1, there is shown a first tooth 12 having a top occlusal surface 14 and an interproximal side surface 16. A hollow cavity preparation 18 has been prepared in tooth 12. The hollow cavity preparation 18 includes an inner surface 19, a side surface 20, an opposite side surface 21 and a bottom surface 22. Using the well-known classification system developed by Dr. G. V. Black in 1908, this would be a Class II cavity involving the interproximal side surface 16 and top occlusal surface 14 of tooth 12, which may be a premolar or molar.

The tools and techniques for removing a portion of the top surface 14 of the tooth 12 and a portion of the interproximal surface 16 of the tooth 12 to form the hollow cavity preparation 18 are well known in the art and therefore will not be explained further. However, the Class II cavity preparation 18 of FIG. 1 is saucer shaped when viewed from above and does not have the usual box-like shape of a conventional Class II cavity preparation. Specifically, the ends 17*a*, 17*b* of the cavity preparation 18 are not tangential to the tooth outside surface. Also, the cavity preparation 18 does not extend inward more than two millimeters inward from the interproximal side surface 16.

Figure 3:
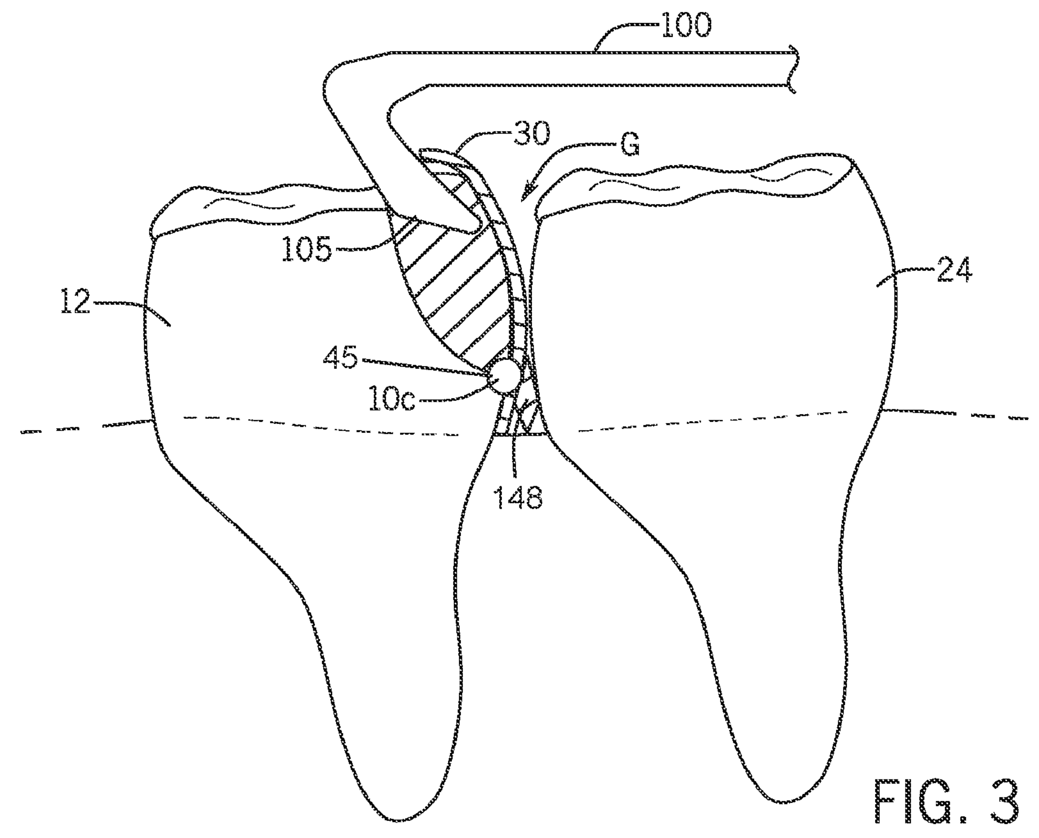
FIG. 3 is a cross-sectional view taken along line 3-3 of FIG. 2.

After preparation of the saucer shaped Class II cavity preparation 18 in the tooth 12 of FIG. 1, a wedge (148 in FIG. 3) is inserted between the interproximal surface 16 of the tooth 12 and the interproximal surface 26 of adjacent tooth 24 to create a gap between the tooth 12 and the tooth 24. Known wedges are suitable for this “pre-wedging” step. A sectional anatomic translucent anatomic dental matrix 30 is inserted between the tooth 12 and the tooth 24 as shown in FIGS. 1 and 3.

The clear plastic anatomical sectional matrix 30 is placed around the tooth 12 maintaining anatomic root adaptation contact. A metallic elastic separator ring 78 is then placed in the interproximal embrasure to create slight tooth separation and additional adaptation pressure on the interproximal wedge 148 and/or the matrix 30. A first tab 87 on the matrix 30 extending away from an edge of the matrix 30 is on a lingual side of the tooth 12 when the matrix surrounds the removed portion of the interproximal surface 16. A second tab 88 on the matrix 30 extending away from the edge of the matrix 30 is on a buccal side of the tooth 12 when the matrix surrounds the removed portion of the interproximal surface 16. Looking at FIG. 1, the dental matrix 30 includes a curved strip 32 of translucent material. The dental matrix 30 can be formed from a translucent material such as a polymeric film. One non-limiting example material is the polyester film commercially available as Mylar™. The strip 32 has a length running from a first end 34 to a second end 36 of the dental matrix 30. The length of the dental matrix 30 is sufficient to extend beyond a first vertical junction 23L of the interproximal cavity preparation 18 and an interproximal surface 16 of the tooth 12 and to extend beyond a second vertical junction 23R of the interproximal cavity preparation 18 and the interproximal surface 16 of the tooth 12 to create the form for filling the interproximal cavity preparation 18. The strip 32 of the dental matrix 30 also has a base portion 42.

Figure 2:
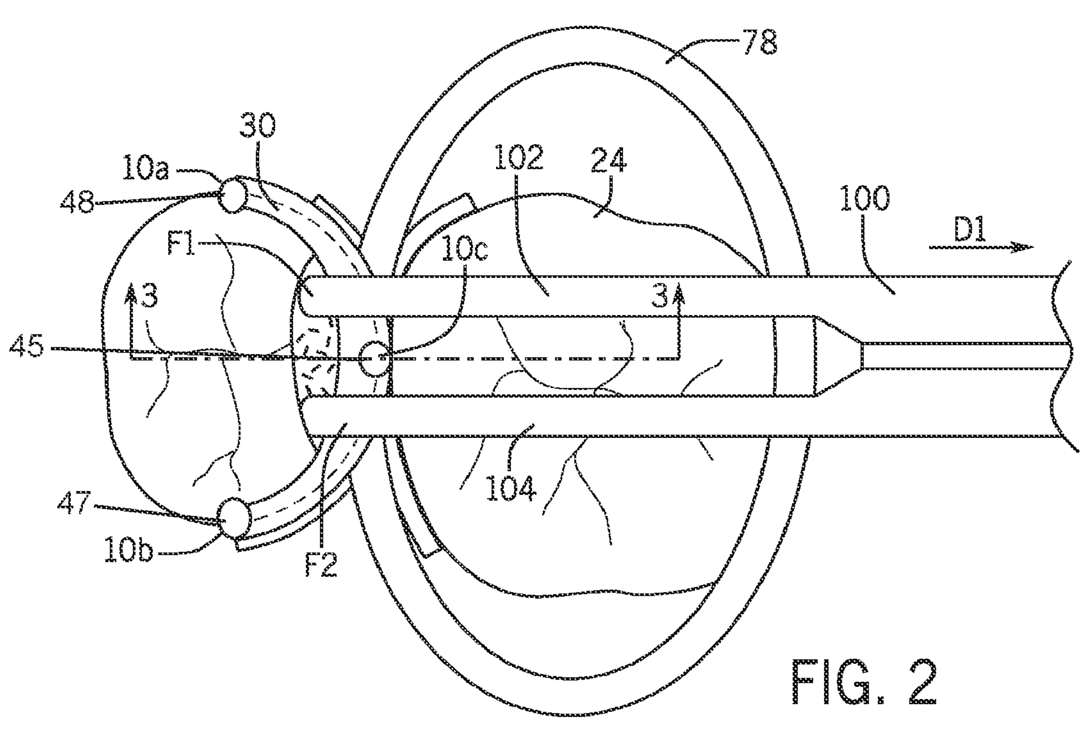
FIG. 2 is a top view of a dental tool of the present disclosure with the spaced apart arms of the dental tool in the wide pull position in a tooth restoration method of the present disclosure.
Figure 4:
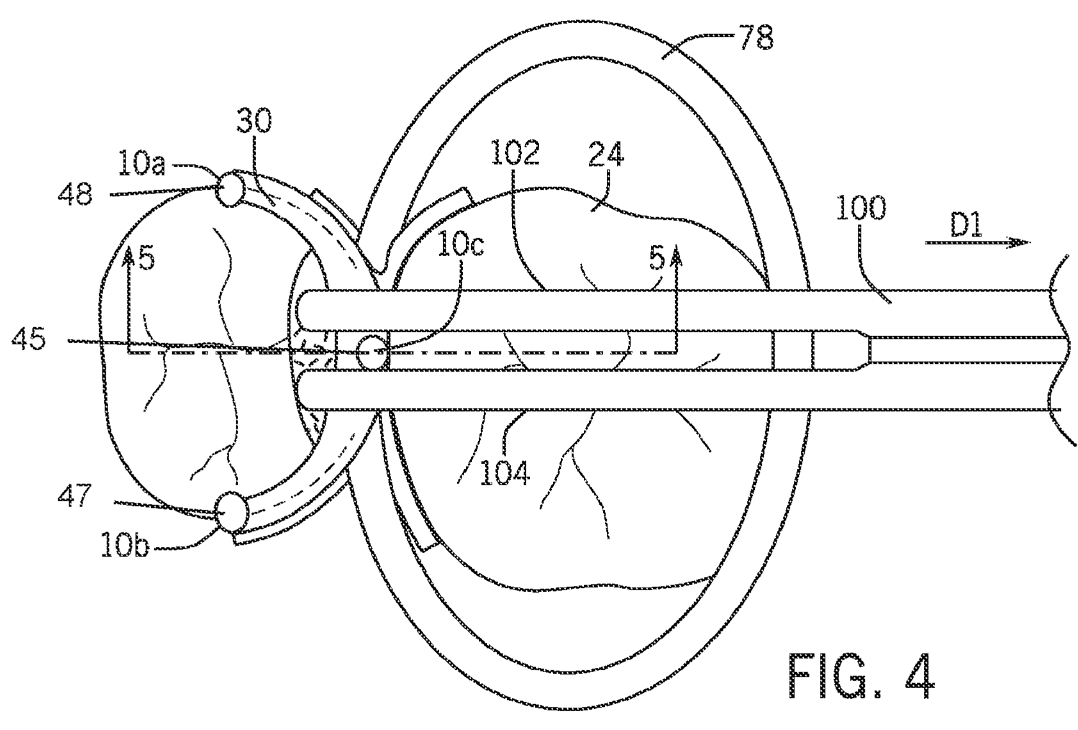
FIG. 4 is a top view of a dental tool of the present disclosure with the spaced apart arms of the dental tool in the narrow pull position in a tooth restoration method of the present disclosure.
Figure 5:
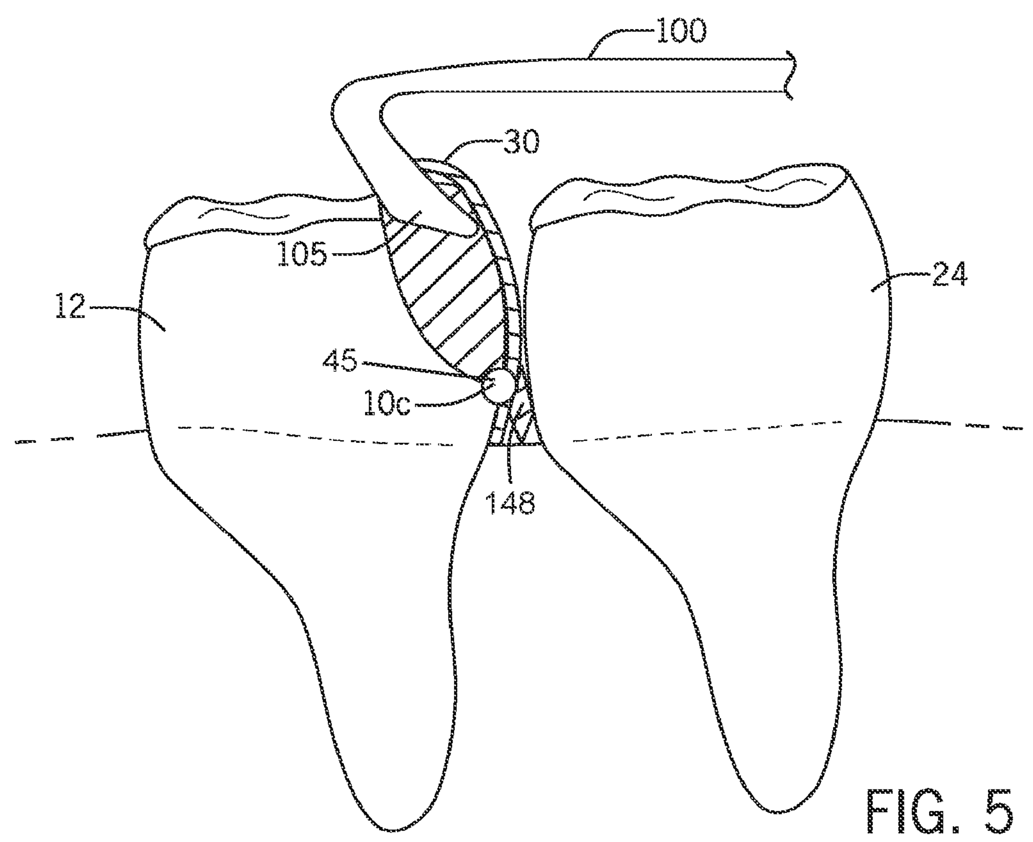
FIG. 5 is a cross-sectional view taken along line 5-5 of FIG. 4.

In the method of the present invention, after the matrix 30 is placed around the tooth 12, the matrix 30 is moved away from the hollow cavity preparation 18 towards adjacent tooth 24. The method of moving the dental matrix 30 away from the hollow cavity preparation 18 towards adjacent tooth 24 includes use of a dental tool 100 having a first arm 102 that is movable toward and away from a second arm 104. In FIG. 2, the first arm 102 and the second arm 104 are in a wider relationship (i.e., there is more space between the first arm 102 and the second arm 104). This wider relationship between the first arm 102 and the second arm 104 may be suitable for pulling the matrix 30 in direction D1 toward adjacent tooth 24 using angled tips 105 of each of the first arm 102 and the second arm 104 when a wider cavity preparation has been formed in the tooth. In FIG. 4, the first arm 102 and the second arm 104 are in a narrower relationship (i.e., there is less space between the first arm 102 and the second arm 104). This narrower relationship between the first arm 102 and the second arm 104 may be suitable for pulling the matrix 30 in direction D1 toward adjacent tooth 24 using angled tips 105 of each of the first arm 102 and the second arm 104 when a narrower cavity preparation has been formed in the tooth. The dental practitioner may also choose to first engage the matrix 30 with the first arm 102 and the second arm 104 in the narrower relationship of FIG. 4 and then allow the first arm 102 and the second arm 104 to open into the wider relationship of FIG. 2 before pulling the matrix in direction D1. Moving from the narrower relationship to the wider relationship between the first arm

102 and the second arm 104 creates spreading forces in directions F1 and F2 that serve to spread open the matrix buccally and lingually thereby expanding the matrix 30. The matrix 30 may be pulled toward the adjacent tooth 24 so that the matrix 30 contacts the adjacent tooth 24 thereby eliminating any gap G (see FIG. 3) present between teeth 12 and 24 when the matrix 30 is placed on the tooth 12.

Figure 6:
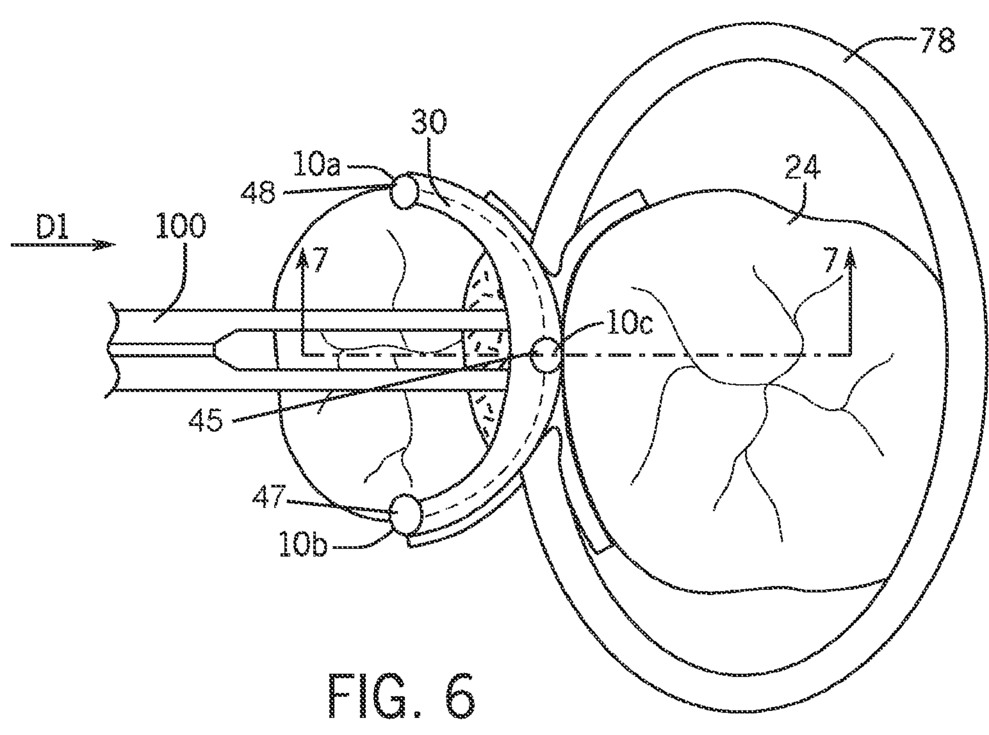
FIG. 6 is a top view of a dental tool of the present disclosure with the spaced apart arms of the dental tool in the narrow push position in a tooth restoration method of the present disclosure.
Figure 7:
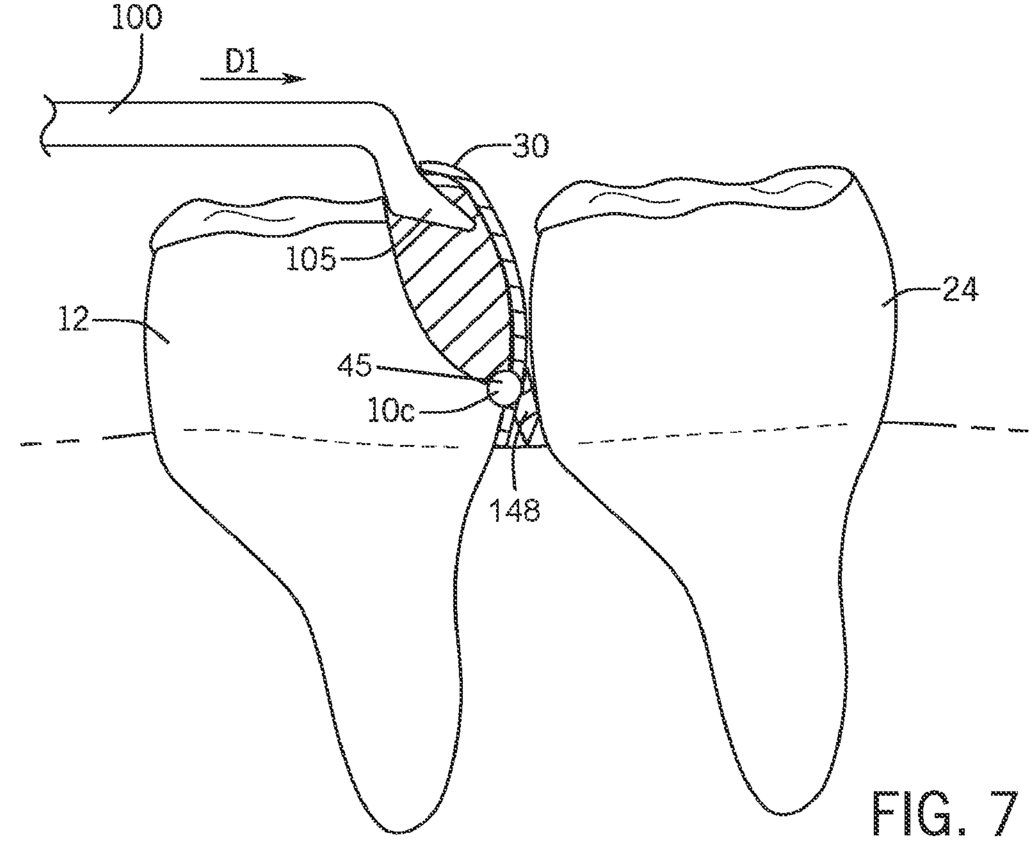
FIG. 7 is a cross-sectional view taken along line 7-7 of FIG. 6.
Figure 8:
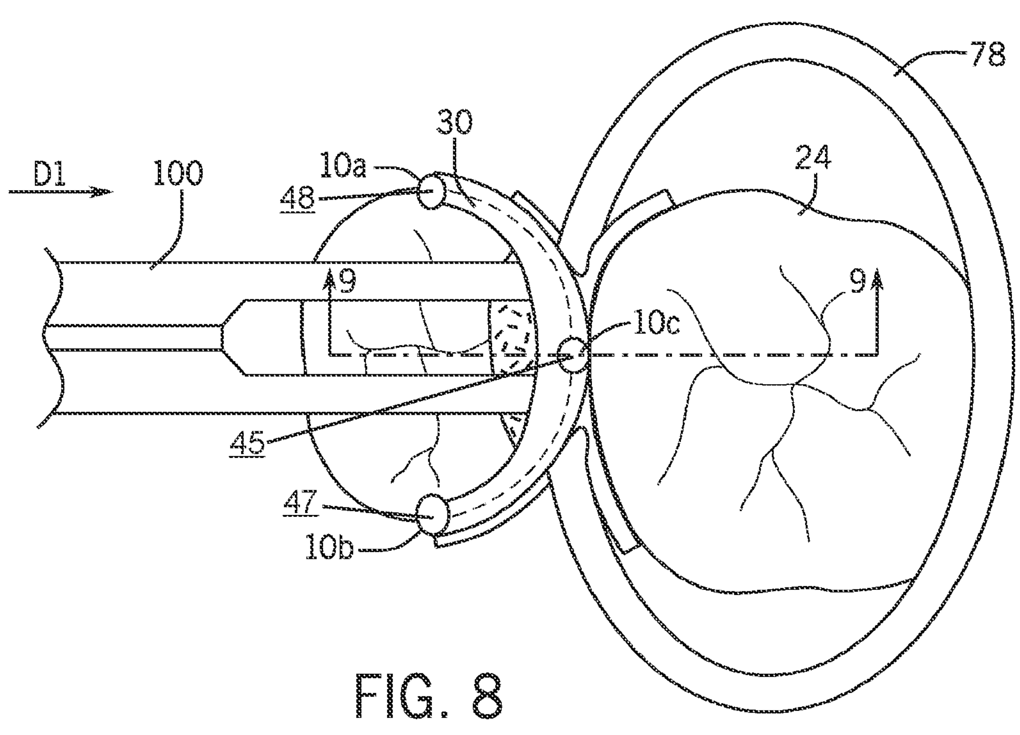
FIG. 8 is a top view of a dental tool of the present disclosure with the spaced apart arms of the dental tool in the wide push position in a tooth restoration method of the present disclosure.
Figure 9:
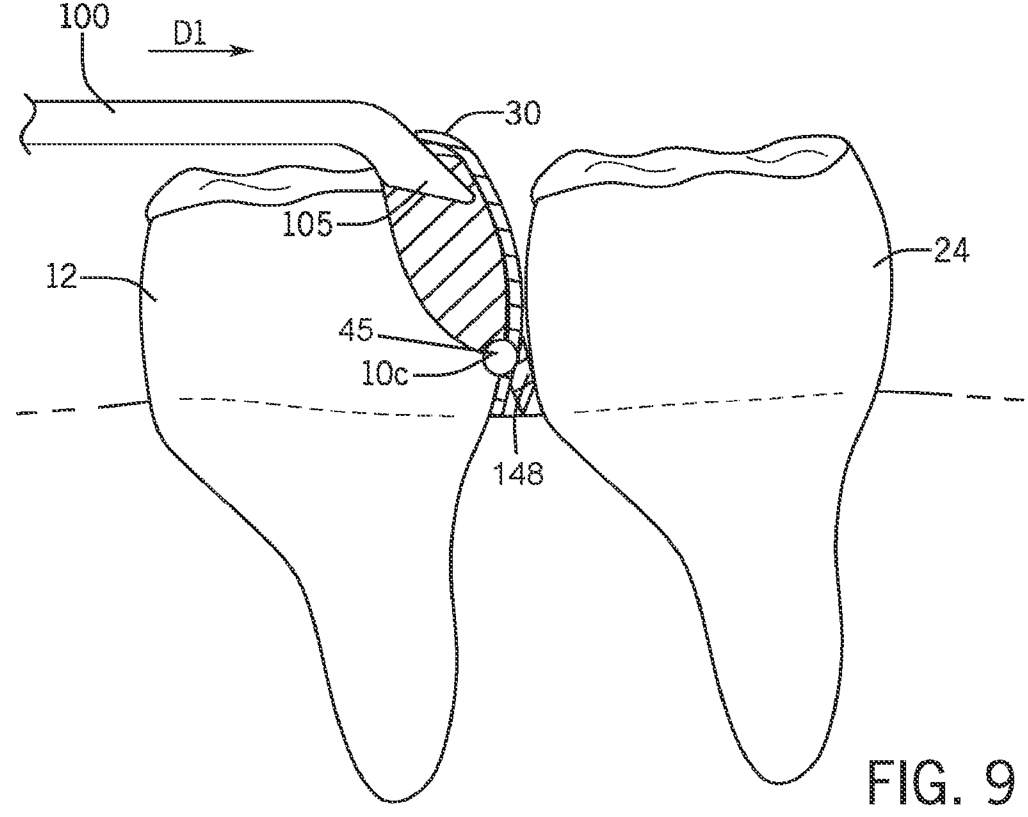
FIG. 9 is a cross-sectional view taken along line 8-8 of FIG. 8.

In FIG. 8, the first arm 102 and the second arm 104 are in a wider relationship (i.e., there is more space between the first arm 102 and the second arm 104). This wider relationship between the first arm 102 and the second arm 104 may be suitable for pushing the matrix 30 in direction D1 toward adjacent tooth 24 using angled tips 105 of each of the first arm 102 and the second arm 104 when a wider cavity preparation has been formed in the tooth. In FIG. 6, the first arm 102 and the second arm 104 are in a narrower relationship (i.e., there is less space between the first arm 102 and the second arm 104). This narrower relationship between the first arm 102 and the second arm 104 may be suitable for pushing the matrix 30 in direction D1 toward adjacent tooth 24 using angled tips 105 of each of the first arm 102 and the second arm 104 when a narrower cavity preparation has been formed in the tooth. The dental practitioner may choose to first engage the matrix 30 with the first arm 102 and the second arm 104 in the narrower relationship of FIG. 6 and then allow the first arm 102 and the second arm 104 to open into the wider relationship of FIG. 8 before pushing the matrix in direction D1. Moving from the narrower relationship to the wider relationship between the first arm 102 and the second arm 104 creates spreading forces in directions F1 and F2 that serve to spread open the matrix buccally and lingually thereby expanding the matrix. The matrix 30 may be pushed toward the adjacent tooth 24 so that the matrix 30 contacts the adjacent tooth 24 thereby eliminating any gap G (see FIG. 9) present between teeth 12 and 24 when the matrix 30 is placed on the tooth 12.

After the matrix 30 has been pushed or pulled into the desired spatial relationship or contacting relationship with the tooth 24, the matrix 30 may be bonded in a desired position on the tooth 12. Looking at FIGS. 1 and 2, the first tab 87 on the matrix 30 is bonded to location 10*b* on the tooth 12 with a cured amount of resin 47, a lower edge of the matrix 30 is bonded to or adjacent a lower interproximal edge 10*c* of the hollow cavity preparation 18 with a cured amount of resin 45, and the second tab 88 on the matrix 30 is bonded to location 10*a* on the tooth 12 with a cured amount of resin 48. This may be accomplished with a variety of techniques. For example, a first amount of a curable flowable composite resin (such as a resin available from 3M under tradename Filtek™) may be placed in contact with the first tab 87 of the matrix 30 and the tooth 12, a second amount of a curable flowable composite resin may be placed in contact with the lower edge of the matrix 30 and the tooth 12, and a third amount of a curable flowable composite resin may be placed in contact with the second tab 88 of the matrix 30 and the tooth 12 before pushing or pulling the matrix 30 into the desired spatial relationship or contacting relationship with the tooth 24. After the matrix 30 has been pushed or pulled into the desired spatial relationship or contacting relationship with the tooth 24, each of the first, second and third amount of the curable flowable composite resin may be light cured thereby bonding the matrix 30 in the desired position on the tooth 12. Alternatively, the first amount of a curable flowable composite resin may be placed in contact with the first tab 87 of the matrix 30 and the tooth 12, a second amount of a curable flowable composite resin may be placed in contact with the lower edge of the matrix 30 and the tooth 12, and a third amount of a curable flowable composite resin may be placed in contact with the second tab 88 of the matrix 30 and the tooth 12 after pushing or pulling the matrix 30 into the desired spatial relationship or contacting relationship with the tooth 24. Each of the first, second and third amount of the curable flowable composite resin may then be light cured thereby bonding the matrix 30 in the desired position on the tooth 12.

Having bonded the matrix 30 in the desired position on the tooth 12, the cavity preparation 18 in tooth 12 is then etched with liquid and/or gel phosphoric acid, about 2 millimeters past the margins. The cavity preparation 18 in tooth 12 is then rinsed and dried. A lightly filled or unfilled light curable resin tooth bonding agent is then applied to tooth 12 covering the entire cavity preparation 18 and about 0.5-1.5 millimeters past the margins. The resin tooth bonding agent is then air thinned except on surface 22 where a small pool of resin tooth bonding agent is maintained. The resin tooth bonding agent is not light cured at this point. Resin tooth bonding agents improve composite to enamel and/or dentin bonding.

A light curable flowable composite resin is then injected directly into the pool of resin tooth bonding agent (under magnification if possible) without incorporating bubbles. A tiny amount of the light curable flowable composite resin is expressed before placement to ensure that there is no air in the cannula. The light curable flowable composite and resin tooth bonding agent are not light cured at this point. Generally, light curable flowable composite resins contain 20-25 percent less filler in the light curable polymeric material than nonflowable paste materials. Light curable flowable composite resins are available under tradenames such as Filtek™ Light curable resins are preferred as light cured resins are more color stable than chemically cured resins.

A light curable paste composite resin is then extruded into the pool of flowable composite resin and resin tooth bonding agent without creating air bubbles, allowing the composite resin to displace most of the lesser filled flowable composite resin and resin tooth bonding agent (under magnification if possible). Composite resins are available under tradenames such as 3M Z100™, and 3M Filtek Supreme™. The next steps are burnishing, carving the anatomy and carving excess composite. There is no need to use a condenser or plugger. The filled cavity preparation is then cured using a curing light such as high intensity light emitting diode (LED) lights, plasma-arc curing lights, halogen lights, and laser lights. This produces a single cured layer of composite resin. The single layer eliminates adding composite resin after initial adding of resin for a seamless final cured layer of composite resin. The matrix 30 and the cured amount of resin bonding the matrix 30 to the tooth 12 may then be removed with appropriate dental tools.

Figure 10:
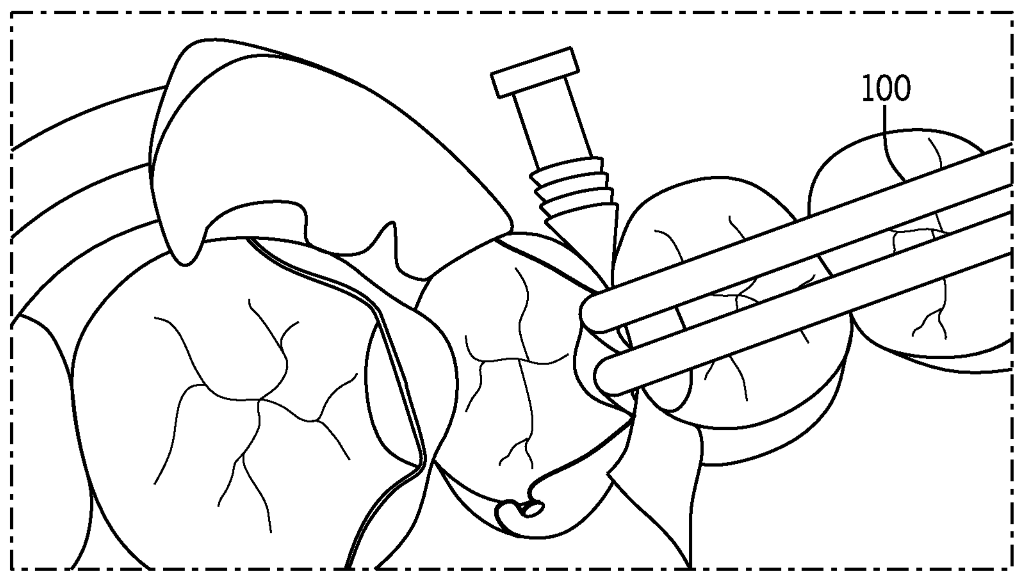
FIG. 10 is a top view of a dental tool in a pull position of a tooth restoration method of the present disclosure.
Figure 11:
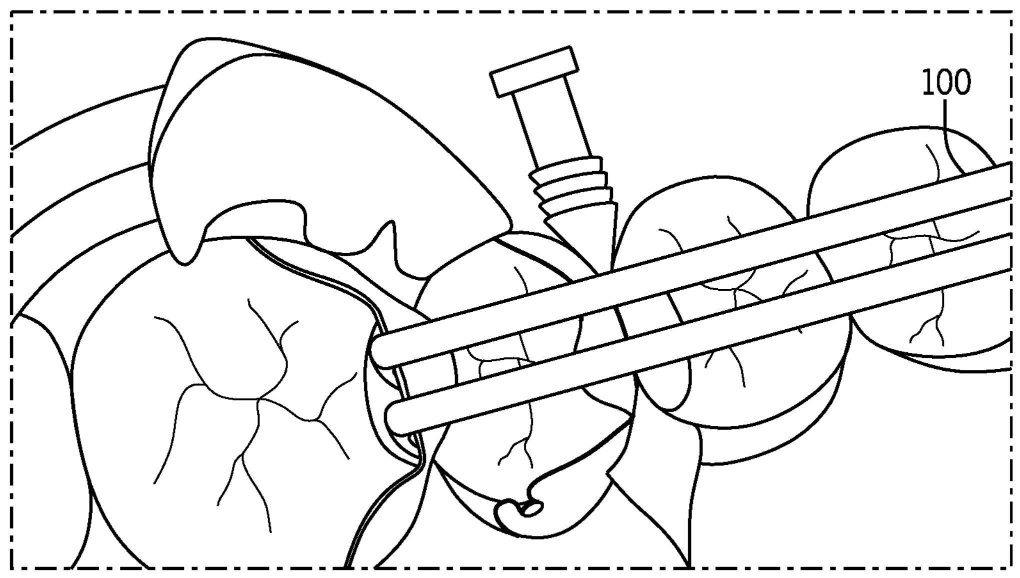
FIG. 11 is a top view of a dental tool in a push position of a tooth restoration method of the present disclosure.

Turning now to FIGS. 10 and 11, the dental tool 100 can be used to pull on a first matrix 30*a* on a mesial side of tooth 12, as shown in FIG. 10, or to push on a second matrix 30*b* on a distal side of tooth 12, as shown in FIG. 11, until the matrix 30 contacts an adjacent tooth. The push-pull method allows for eliminating any gaps between tooth 12 and adjacent tooth after the dental restoration is complete. In the method shown in FIGS. 10 and 11, it is advantageous that the wedge 248 is a wedge described in PCT Patent Application Publication No. WO 2015/187927 and the separator 278 is a separator device described in PCT Patent Application Publication No. WO 2016/183360.

Figure 12:
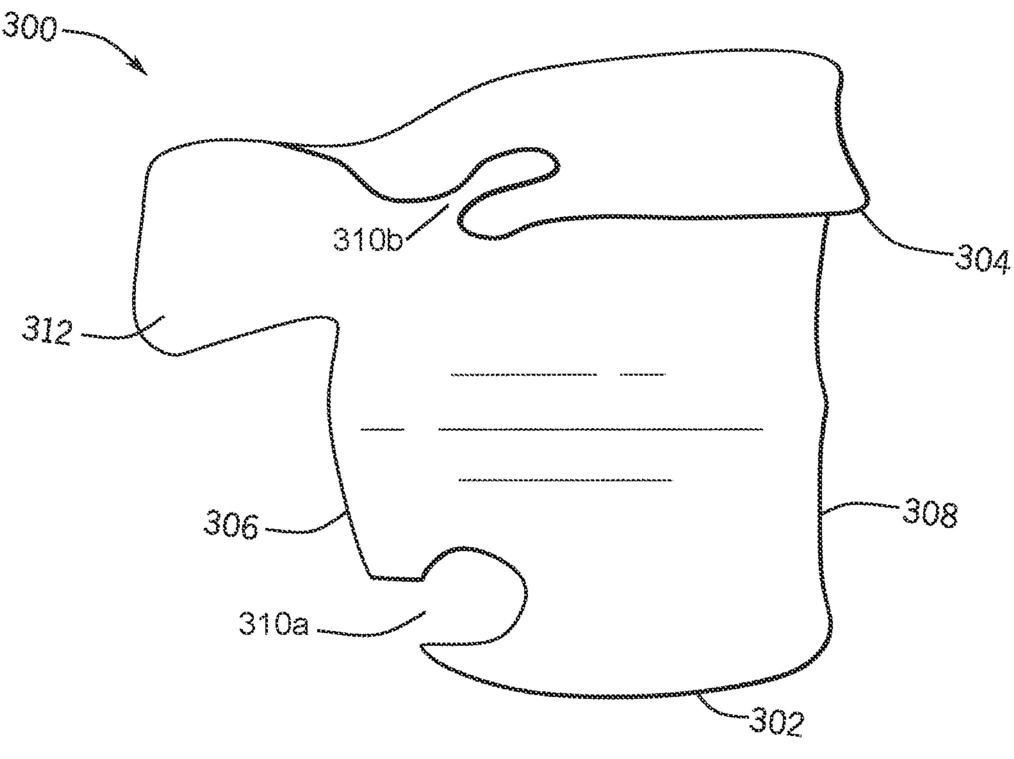
FIG. 12 is a perspective view of one embodiment of a matrix of the present disclosure.
Figure 13:
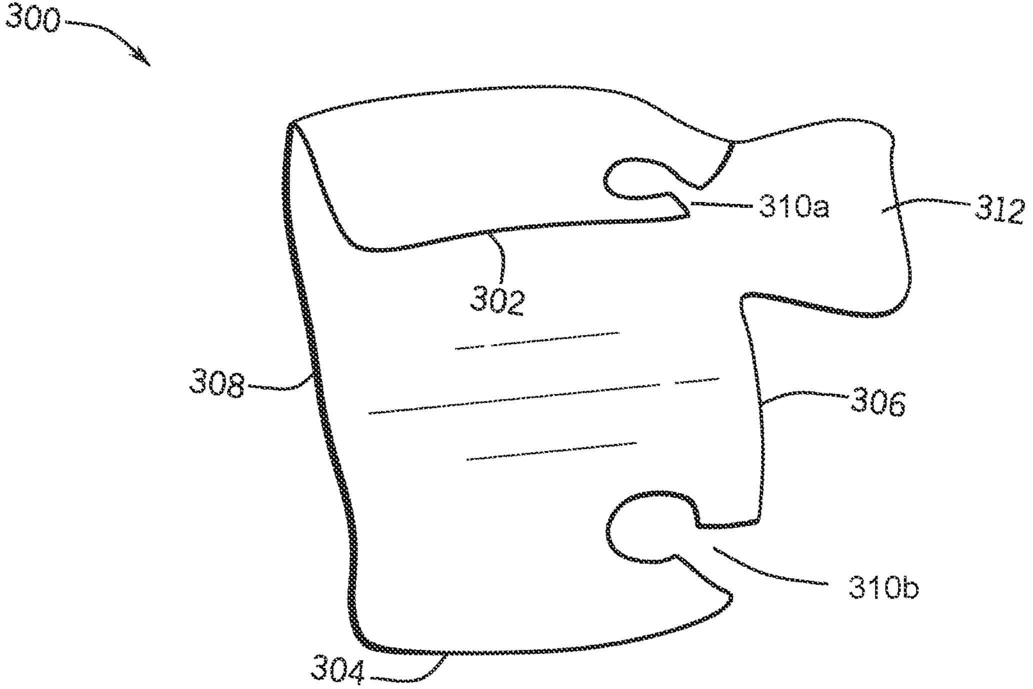
FIG. 13 is another perspective view of the matrix of FIG. 12.

Turning now to FIGS. 12 and 13, there is shown a dental matrix 300 according to another embodiment of the present disclosure. The dental matrix 300 can be a thickness within a range of 50 micrometers to 100 micrometers. As an example, the dental matrix 300 can have a thickness of 75 micrometers. The dental matrix 300 includes a curved strip. The dental matrix 300 can be formed from a translucent material such as a polymeric film. One non-limiting example material is the polyester film commercially available as Mylar™. The strip can have a length from a first edge 302 to a second edge 304. The length of the strip is sufficient to create a form for molding a restorative material to a surface of a tooth to be restored, as described above. The strip can also have a width from a top edge 306 to a bottom edge 308. The strip may or may not have a tab 312 intermediate the first edge 302 and the second edge 304. The strip can further include an inwardly directed cutaway 310*a* located between the tab 312 and the first edge 302. Another inwardly directed cutaway 310*b* can be located between the tab 312 and the second edge 304.

In some embodiments, the top edge 306 and the first edge 302 are joined at the inwardly directed cutaway 310*a*. The top edge 306 and the second edge 304 can also be joined at another inwardly directed cutaway 310*b*. The inwardly directed cutaways 310*a*, 310*b* can be a keyway shape, a square shape, or a rectangular shape. The inwardly directed cutaways 310*a*, 310*b* can be at an angle. The angle can be defined between the first edge 302 and the top edge 306 or between the second edge 304 and the top edge 306. The angle of the inwardly directed cutaways 310*a*, 310*b* can be within a range of 30 degrees to 70 degrees. As one example, the angle of the inwardly directed cutaways 310*a*, 310*b* can be 45 degrees. The inwardly directed cutaways 310*a*, 310*b* can be used as a marker for locating a position along the matrix 300 during the process of restoration of a tooth. The process of performing and teaching the restoration of the tooth 12 can be standardized and made consistent between different restorations by bonding the matrix 300 to the tooth 12 at the same location each time.

In another embodiment of the present disclosure, there is provided a method for the restoration of a tooth including a top surface, and an interproximal surface facing an adjacent tooth. The method of restoration includes removing a portion of the top surface of the tooth, and a portion of the interproximal surface of the tooth to form a hollow cavity preparation extending from the top surface to the interproximal surface. The removed portion of the interproximal space is surrounded by a dental matrix. The dental matrix includes a cutaway. Restoration of the tooth further includes moving the dental matrix away from the hollow cavity preparation towards the adjacent tooth, and bonding at least one section of the dental matrix to the tooth at the cutaway. Light-curable composite resin is injected into the cavity preparation and light cured.

There is shown various steps and devices for another example method according the second embodiment of the invention. This example method is similar to the example method as described above. In a first step, the dentist locates a first tooth having a cavity. Referring to FIG. 1, there is shown a first tooth 12 having a top occlusal surface 14 and an interproximal side surface 16. A hollow cavity preparation 18 has been prepared in tooth 12. The hollow cavity preparation 18 includes an inner surface 19, a side surface 20, an opposite side surface 21 and a bottom surface 22. Using the well-known classification system developed by Dr. G. V. Black in 1908, this would be a Class II cavity involving the interproximal side surface 16 and top occlusal surface 14 of tooth 12, which may be a premolar or molar.

After preparation of the saucer shaped Class II cavity preparation 18 in the tooth 12 of FIG. 1, as described above, a wedge (148 in FIG. 3) is inserted between the interproximal surface 16 of the tooth 12 and the interproximal surface 26 of adjacent tooth 24 to create a gap between the tooth 12 and the tooth 24. Known wedges are suitable for this "pre-wedging" step. A sectional anatomic translucent anatomic dental matrix 300 is inserted between the tooth 12 and the tooth 24 as shown in FIGS. 1 and 3.

The clear plastic anatomical sectional matrix 300 is placed around the tooth 12 maintaining anatomic root adaptation contact. A metallic elastic separator ring 78 is then placed in the interproximal embrasure to create slight tooth separation and additional adaptation pressure on the interproximal wedge 148 and/or the matrix 300.

In the method of the present invention, after the matrix 300 is placed around the tooth 12, the matrix 300 is moved away from the hollow cavity preparation 18 towards adjacent tooth 24. The method of moving the dental matrix 300 away from the hollow cavity preparation 18 towards adjacent tooth 24 is similar to that described above.

After the matrix 300 has been pushed or pulled into the desired spatial relationship or contacting relationship with the tooth 24, the matrix 300 may be bonded in a desired position on the tooth 12. The matrix 300 includes cutaways 310*a*, 310*b* each located near the first edge 302 and the second edge 304, respectively. The matrix 300 is bonded to the tooth 12 at the cutaways 310*a*, 310*b* with a cured amount of resin 47. This may be accomplished with a variety of techniques. For example, a first amount of a curable flowable composite resin (such as a resin available from 3M under tradename Filtek™) may be placed in contact with the matrix 300 and the tooth 12 at a cutaway 310*a* joining the first edge 302 and the top edge 306. A second amount of a curable flowable composite resin may be placed in contact the matrix 300 and the tooth 12 at a cutaway 310*b* joining the second edge 304 and the top edge 306. The curable flowable composite resin is placed in each location by injecting the curable flowable composite resin through the cutaways 310*a*, 310*b* before pushing or pulling the matrix 300 into the desired spatial relationship or contacting relationship with the tooth 24. After the matrix 300 has been pushed or pulled into the desired spatial relationship or contacting relationship with the tooth 24, each of the first, and second amount of the curable flowable composite resin may be light cured thereby bonding the matrix 300 in the desired position on the tooth 12. The curable flowable composite resin may be light cured through the cutaways 310*a*, 310*b* thereby creating a mechanical lock between the tooth 12 and the matrix 300 through the cutaways 310*a*, 310*b*.

Alternatively, the first amount of a curable flowable composite resin may be placed in contact with the matrix 300 and the tooth 12 at a cutaway 310*a* joining a first edge 302 and a top edge 306. A second amount of a curable flowable composite resin may be placed in contact with the matrix 300 and the tooth 12 at a cutaway 310*b* joining a second edge 304 and a top edge 306, after pushing or pulling the matrix 300 into the desired spatial relationship or contacting relationship with the tooth 24. The cutaways 310*a*, 310*b* provide a consistent location for bonding the matrix 300 to the tooth 12. Each of the first, and second amount of the curable flowable composite resin may then be light cured thereby bonding the matrix 300 in the desired position on the tooth 12 through the cutaways 310*a*, 310*b*. Light curing the curable flowable composite resin creates a mechanical lock between the tooth 12 and the matrix 300.

Figure 14:
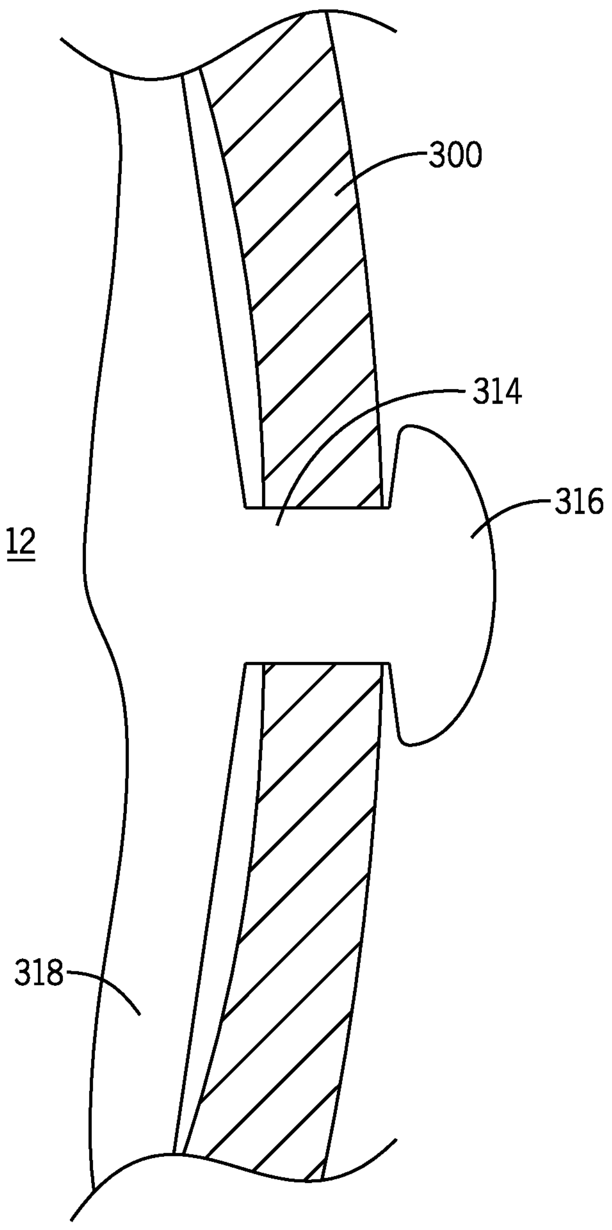
FIG. 14 is a cross-sectional view taken along line 14-14 of FIG. 12.

Looking to FIG. 14, the curable flowable composite resin placed in contact with the matrix 300 and the tooth 12 at the cutaway 310*a* creates a vertical portion 314 and a top portion 316 from the curable flowable composite resin at the cutaway 310*a*. The vertical portion 314 connects the matrix 300 to the tooth 12 through a cavity to be filled 318. The top portion 316 creates a dome on top of the matrix 300 connecting the vertical portion 314 to the top of the matrix 300. A combination of the vertical portion 314 and the top portion 316 create the mechanical lock that secures the matrix 300 to the tooth 12 in the desired position.

Having bonded the matrix 300 in the desired position on the tooth 12 by a mechanical lock between the matrix 300 and the tooth 12, the cavity preparation 18 in tooth 12 is then etched with liquid and/or gel phosphoric acid, about 2 millimeters past the margins. The cavity preparation 18 in tooth 12 is then rinsed and dried. A lightly filled or unfilled light curable resin tooth bonding agent is then applied to tooth 12 covering the entire cavity preparation 18 and about 0.5-1.5 millimeters past the margins. The resin tooth bonding agent is then air thinned except on surface 22 where a small pool of resin tooth bonding agent is maintained. The resin tooth bonding agent is not light cured at this point. Resin tooth bonding agents improve composite to enamel and/or dentin bonding.

A light curable flowable composite resin is then injected directly into the pool of resin tooth bonding agent (under magnification if possible) without incorporating bubbles. The light curable flowable composite and resin tooth bonding agent are not light cured at this point. A light curable paste composite resin is then extruded into the pool of flowable composite resin and resin tooth bonding agent without creating air bubbles, allowing the composite resin to displace most of the lesser filled flowable composite resin and resin tooth bonding agent (under magnification if possible). The next steps are burnishing, carving the anatomy and carving excess composite. The filled cavity preparation is then cured producing a single cured layer of composite resin. The single layer eliminates adding composite resin after initial adding of resin for a seamless final cured layer of composite resin.

The matrix 300 and the cured amount of resin bonding the matrix 300 to the tooth 12 may then be removed with appropriate dental tools. Once the matrix 300 is removed, it leaves leaving a smooth restoration of the tooth 12. Taking the matrix 300 away can involve using the appropriate dental tool to simply pull the matrix 300 in a direction away from the tooth 12. Bonding the tooth 12 and the matrix 300 at the cutaway 310*a* by a mechanical lock prevents the matrix 300 from ripping or tearing while it is being removed after the restoration is complete. Any excess composite that is left bonded to the tooth 12 from the mechanical lock, at the vertical portion 314 or the top portion 316 can be removed by burnishing, carving the anatomy and carving excess composite away to mold the shape of the tooth 12 to be similar to that of a natural tooth. The matrix 300 can be reused on a different tooth in the same patient because the quality of the matrix 300 has not been compromised.

Looking to FIG. 2, the dental tool 100 can be selected for a variety of operations. For example, the dental tool 100 can be used to pull on a first matrix 30*a* on a mesial side of tooth 12, as shown in FIG. 10, or to push on a second matrix 30*b* on a distal side of tooth 12, as shown in FIG. 11, until the matrix 300 contacts an adjacent tooth. The push-pull method allows for eliminating any gaps between tooth 12 and adjacent tooth after the dental restoration is complete, as described above.

The dental tool can include a first arm and a second arm. As an example, both the first arm and the second arm can be moved towards each other and away from each other to adjust the width between the first arm and the second arm. Adjusting the width of the arms allows the dental tool to be flexible for a variety of cavity preparations. Preferably, the first arm and the second arm can be moved towards and away from each other for wider or narrower cavity preparations.

The dental tool can further include an adjustment module and textured sides on the first and second arm to adjust the first arm and the second arm. The adjustment module can be a slider, wedge, elastic (e.g., silicone) ring, knurled knob, screw knob, or a rotating knurled threaded tightener.

Each of the mechanisms of the adjustment module of the dental tool can be configured to move the first and second arm of the dental tool in a variety of ways. For example, the slider is kept in place by textured sides of the dental tool. As another example, a welded end can join the first arm and the second arm. The slider can also include a pin slot. The pin slot, made of stainless steel, is pressed forward for narrow cavities and pulled back to space apart the first arm and the second arm of the dental tool for wider cavity preparations.

Looking to FIGS. 15 to 27*b*, there are shown a variety of embodiments of the dental tool. The dental tool, as used and described above, can be chosen from any one of the embodiments of the dental tools shown in FIGS. 15 to 27*b*.

Figure 15:
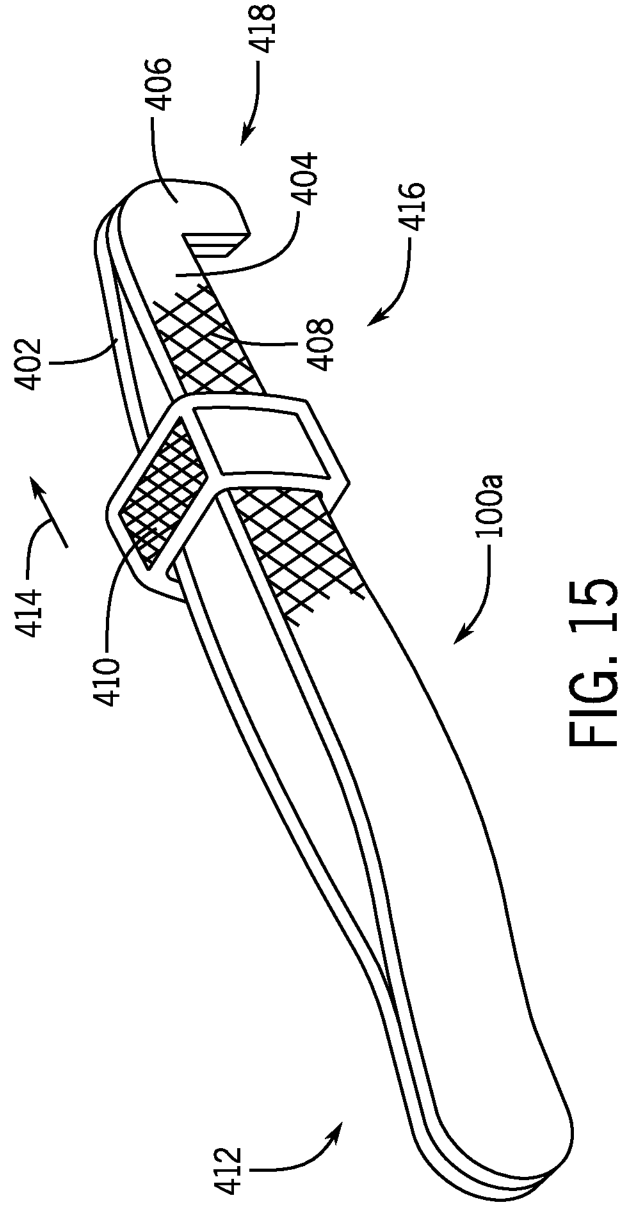
FIG. 15 is a top perspective view of another embodiment of a dental tool of the present disclosure.

Referring to FIG. 15, a dental tool 100*a* includes a slider 410 to adjust the spacing of the first arm 402 and the second arm 404 of the dental tool 100*a*. Each of the first arm 402 and the second arm 404 includes a curved tooth 406 at a distal end 418. The tooth 406 allows for the dental tool 100*a* to push or pull on a device used in a dental procedure. For example, the dental tool 100*a* can pull on a first matrix on a mesial side of tooth. As another example, the dental tool 100*a* can push on a second matrix on a distal side of tooth, until the matrix contacts an adjacent tooth.

The slider 410 is kept in place by textured sides 408 of the dental tool 100*a*. The slider 410 can be moved in a direction 414 towards the distal end of the dental tool or in an opposite direction to direction 414 towards a proximal end of the dental tool. Moving the slider 410 in these directions allows the user to easily adjust the separation distance between the first and second arms of the dental tool. Moving the slider in the direction 414 adjusts the first and second arms closer to one another, thereby making the width between the first arm and the second arm smaller. A smaller width is advantageous when working with smaller teeth. Moving the slider in the opposite direction to direction 414 adjusts the first and second arms further apart from one another, thereby making the width between the first arm and the second arm larger. The larger width is advantageous when working with larger teeth. The adjustable grip and width on the dental tool allows for the dental tool to be used on teeth of various shapes and sizes, making the dental tool suitable for all patient's teeth.

The slider is kept in place by the textured sides 408. The texture keeps the slider from moving once it has been fixed into place. Once the slider has been adjusted to a particular spot by the user, it is desired by the user that the slider does not move. The textured sides keep the slider in place, thereby keeping the first arm and the second arm at a fixed distance from each other. The textured sides provide friction that prevents the slider form moving, and provides a location for the user to grab the dental tool.

A welded end 412 joins the first arm 402 and the second arm 404 at a proximal end of the dental tool. The welded end 412, in addition to the slider fixed by the textured sider, also keeps the first arm and the second arm at a fixed distance. The welded end 412 provides a location for the user to grip the dental tool without mistakenly adjusting the first arm, the second arm, or the slider. The welded end can be gripped to place the dental tool near a desired tooth after adjusting the slider to a location that caters to the width of the desired tooth. The welded end is a mechanism to link the first arm and the second arm together. For example, the first arm and the second arm can be soldered, glued, fused, or otherwise bonded to one another.

Referring now to FIG. 16*a*, a dental tool 100*b* includes a slider 508 and a pin slot 514. The pin slot 514, made of stainless steel, is pressed forward for narrow cavities and pulled back to space apart the first arm 502 and the second arm 504 of the dental tool 100*b* for wider cavity preparations. Each of the first arm 502 and the second arm 504 includes a curved tooth 506 at a distal end. The tooth 506 allows for the dental tool 100*b* to push or pull on a device used in a dental procedure. For example, the dental tool 100*b* can pull on a first matrix on a mesial side of tooth. As another example, the dental tool 100*b* can push on a second matrix on a distal side of tooth, until the matrix contacts an adjacent tooth.

The slider 508 is kept in place by the slots within the pin slot 514. The slider 508 can be moved in a direction 516 towards the distal end of the dental tool or in an opposite direction to direction 516 towards a proximal end of the dental tool. Moving the slider 508 in these directions allows the user to easily adjust the separation distance between the first and second arms of the dental tool. Moving the slider in the direction 516 adjusts the first and second arms closer to one another, thereby making the width between the first arm and the second arm smaller. A smaller width is advantageous when working with smaller teeth. Moving the slider in the opposite direction to direction 516 adjusts the first and second arms further apart from one another, thereby making the width between the first arm and the second arm larger. The larger width is advantageous when working with larger teeth. The adjustable grip and width on the dental tool allows for the dental tool to be used on teeth of various shapes and sizes, making the dental tool suitable for all patients teeth.

Looking to FIG. 16*b*, the slider 508 is kept in place by the pin slot 514. The slider is moved to be configured in place within a slot of the pin slots 514. The slider has a textured top surface 510 and through holes 518 configured to have pins 520 inserted into the through holes 518. The textured top surface 510 allows the user to press the slider forward and backward to configure the through holes 518 into one of the pin slots 514. Once the slider has been adjusted to a particular slot by the user, it is desired that the slider does not move. The slots 514 and the pins 520 ensure that the slider is kept in place, thereby keeping the first arm and the second arm at a fixed distance from each other. The textured sides provide friction that prevents the slider form moving, and provides a location for the user to grab the dental tool.

A proximal end 512 joins the first arm 502 and the second arm 504. The end 512, in addition to the slider fixed by the textured sider, also keeps the first arm and the second arm at a fixed distance. The end 512 provides a location for the user to grip the dental tool without mistakenly adjusting the first arm, the second arm, or the slider. The end 512 can be gripped to place the dental tool near a desired tooth after adjusting the slider to a location that caters to the width of the desired tooth. The end 512 is a mechanism to link the first arm and the second arm together. For example, the first arm and the second arm are inserted into a hollow tube and are kept in place within the tube. The first arm and the second arm can be soldered, glued, fused, or otherwise bonded to one another within the tube to secure the first arm and the second arm to the proximal end 512.

Referring now to FIG. 17*a*, a dental tool 100*c* includes a wedge 608 and a sheath 612 for moving the wedge 608 forward and backward. Moving the wedge 608 forward allows the first arm 602 and the second arm 604 of the dental tool 100*c* to be narrower in size for narrower cavity preparations, while moving the wedge 608 backward allows the first arm 602 and the second arm 604 of the dental tool 100*c* to be wider in size for wider cavity preparations. Each of the first arm 602 and the second arm 604 includes a curved tooth 606 at towards a distal end direction 620. The tooth 606 allows for the dental tool 100*c* to push or pull on a device used in a dental procedure. For example, the dental tool 100*c* can pull on a first matrix on a mesial side of tooth. As another example, the dental tool 100*c* can push on a second matrix on a distal side of tooth, until the matrix contacts an adjacent tooth.

The wedge 608 can be a triangular prism shaped wedge that is configured to be between the first arm 602 and the second arm 604. The wedge 608 is held in place by the sheath 612. The sheath 612 is configured within a tube-like structure 610 that couples the end 618 to the first arm 602 and the second arm 604. The end 618 is located at a proximal end of the dental tool 100*c*. The end 618 can be twisted in a direction 622 to rotate the sheath 612, thereby moving the wedge. The end 618 also provides a location for the user to grip the dental tool without mistakenly adjusting the first arm, the second arm, or the wedge. The end 618 can be gripped to place the dental tool near a desired tooth after adjusting the wedge to a location that caters to the width of the desired tooth. The end provides a mechanism to link the first arm and the second arm together. For example, the first arm and the second arm can be soldered, glued, fused, or otherwise bonded to one another.

Looking to FIG. 17*b*, the sheath 612 also includes a ribbed portion 614 at a distal end of the sheath 612. The ribbed portion 614 is configured to be inserted into a hole 624 and into the wedge 608. The ribbed portion 614 couples the sheath to the wedge through the hole 624 and keeps the wedge in place between the first arm 602 and the second arm 604. Once the wedge has been adjusted to a particular spot by the user, it is desired by the user that the wedge does not move. The ribbed portion 614 keeps the wedge in place, thereby keeping the first arm and the second arm at a fixed distance from each other.

When the wedge is moved, the first arm and the second arm are also moved. For example, when the end 618 is rotated in the direction of 622, the first arm and the second arm are moved further apart, thereby making the width between the first arm and the second arm larger. The larger width is advantageous when working with larger teeth. As another example, when the end 618 is rotated in the opposite direction of 622, the first arm and the second arm are moved closer to one another, thereby making the width between the first arm and the second arm smaller. A smaller width is advantageous when working with smaller teeth. The adjustable grip and width on the dental tool allows for the dental tool to be used on teeth of various shapes and sizes, making the dental tool suitable for all patients teeth.

Looking to FIG. 17*c*, the first arm 602 and the second arm 604 can be fixed to a variety of distances from one another. As an example shown in FIG. 17*c*, the first arm 602 and the second arm 604 are configured at a distance from each other. In FIG. 17*d*, the first arm 602 and the second arm 604 are shown in a flattened condition. In an alternative embodiment, a spring is placed between the first arm 602 and the second arm 604 of the dental tool 100*c*. The user presses the first arm 602 and the second arm 604 together to be narrower in size for narrower cavity preparations, while not compressing the first arm 602 and the second arm 604 allows the first arm 602 and the second arm 604 of the dental tool 100*c* to be wider in size for wider cavity preparations.

Referring now to FIG. 18*a*, a dental tool 100*d* includes an elastic (e.g., silicone) ring 710. Grooves 708 along the sides of the dental tool 100*d* capture the ring 710 for an adjustable location of the ring 710 along the dental tool. Moving the ring 710 forward allows the first arm 702 and the second arm 704 of the dental tool 100*d* to be narrower in size for narrower cavity preparations, while moving the ring 710 backward allows the first arm 702 and the second arm 704 of the dental tool 100*d* to be wider in size for wider cavity preparations. Each of the first arm 702 and the second arm 704 includes a curved tooth 706 at a distal end 716. The tooth 706 allows for the dental tool 100*d* to push or pull on a device used in a dental procedure. For example, the dental tool 100*d* can pull on a first matrix on a mesial side of tooth. As another example, the dental tool 100*d* can push on a second matrix on a distal side of tooth, until the matrix contacts an adjacent tooth.

The ring 710 is kept in place by grooves 708 located on a bottom surface of the first arm 702 and the second arm 704 of the dental tool 100*d*. The ring 710 can be moved in a direction 714 towards the distal end of the dental tool or in an opposite direction to direction 714 towards a proximal end of the dental tool. Moving the ring 710 in these directions allows the user to easily adjust the first and second arms of the dental tool. Moving the ring in the direction 714 adjusts the first and second arms closer to one another, thereby making the width between the first arm and the second arm smaller. A smaller width is advantageous when working with smaller teeth. Moving the ring in the opposite direction to direction 714 adjusts the first and second arms further apart from one another, thereby making the width between the first arm and the second arm larger. The larger width is advantageous when working with larger teeth. The adjustable grip and width on the dental tool allows for the dental tool to be used on teeth of various shapes and sizes, making the dental tool suitable for all patients teeth.

The ring 710 is shown in FIG. 18*b*. The ring 710 is a ring with an empty center that can be adjusted around the first arm and the second arm. The ring 710 is kept in place by the grooves 708. The grooves 708 keep the ring from moving once it has been fixed into place. The ring 710 can be adjusted by a user pushing the forwards or backwards into a groove of the grooves 708. Once the ring has been adjusted to a particular spot by the user, it is desired by the user that the ring does not move. The grooves keep the ring in place, thereby keeping the first arm and the second arm at a fixed distance from each other. The grooves provide a plurality of predetermined adjustments for the first and second arms to be moved into.

A rounded end 712 joins the first arm 702 and the second arm 704. The rounded end 712, in addition to the ring fixed by the grooves, also keeps the first arm and the second arm at a fixed distance. The end 712 provides a location for the user to grip the dental tool without mistakenly adjusting the first arm, the second arm, or the ring. The end can be gripped to place the dental tool near a desired tooth after adjusting the ring to a location that caters to the width of the desired tooth. The end is a mechanism to link the first arm and the second arm together. For example, the first arm and the second arm can be soldered, glued, fused, or otherwise bonded to one another.

Referring now to FIG. 19, a dental tool 100*e* includes an adjustable tab slider 810 with a textured siding 816 to keep the slider 810 in place as it is moved forward or backward. Moving the slider forward allows the first arm 802 and the second arm 804 of the dental tool 100*e* to be narrower in size for narrower cavity preparations, while moving the slider 810 backward allows the first arm 802 and the second arm 804 of the dental tool 100*e* to be wider in size for wider cavity preparations. Each of the first arm 802 and the second arm 804 includes a curved tooth 806 at a distal end 818. The tooth 806 allows for the dental tool 100*e* to push or pull on a device used in a dental procedure. For example, the dental tool 100*e* can pull on a first matrix on a mesial side of tooth. As another example, the dental tool 100*e* can push on a second matrix on a distal side of tooth, until the matrix contacts an adjacent tooth.

The slider 810 is kept in place by textured sides 816 of the dental tool 100*e*. The slider 810 can be moved in a direction 814 towards the distal end of the dental tool or in an opposite direction to direction 814 towards a proximal end of the dental tool. Moving the slider 810 in these directions allows the user to easily adjust the separation distance between the first and second arms of the dental tool. Moving the slider in the direction 814 adjusts the first and second arms closer to one another, thereby making the width between the first arm and the second arm smaller. A smaller width is advantageous when working with smaller teeth. Moving the slider in the opposite direction to direction 814 adjusts the first and second arms further apart from one another, thereby making the width between the first arm and the second arm larger. The larger width is advantageous when working with larger teeth. The adjustable grip and width on the dental tool allows for the dental tool to be used on teeth of various shapes and sizes, making the dental tool suitable for all patients teeth.

The slider is kept in place by the textured sides 816. The texture keeps the slider from moving once it has been fixed into place. Once the slider has been adjusted to a particular spot by the user, it is desired by the user that the slider does not move. The textured sides keep the slider in place, thereby keeping the first arm and the second arm at a fixed distance from each other. The textured sides provide friction that prevents the slider form moving, and provides a location for the user to grab the dental tool.

A welded end 812 joins the first arm 802 and the second arm 804. The welded end 812, in addition to the slider fixed by the textured sides, also keeps the first arm and the second arm at a fixed distance. The welded end 812 provides a location for the user to grip the dental tool without mistakenly adjusting the first arm, the second arm, or the slider. The welded end can be gripped to place the dental tool near a desired tooth after adjusting the slider to a location that caters to the width of the desired tooth. The welded end is a mechanism to link the first arm and the second arm together. For example, the first arm and the second arm can be soldered, glued, fused, or otherwise bonded to one another.

Referring now to FIG. 20*a*, a dental tool 100*f* includes a slider 910 and notches 912 along the right and left sides of the dental tool 100*f*. The slider 910 can be moved forward and backward along the dental tool 100*f* with a spring and wedge incorporated within the slider 910. Moving the slider 910 forward allows the first arm 902 and the second arm 904 of the dental tool 100*f* to be narrower in size for narrower cavity preparations, while moving the slider backward allows the first arm 902 and the second arm 904 of the dental tool 100*f* to be wider in size for wider cavity preparations. Each of the first arm 902 and the second arm 904 includes a curved tooth 906 at a distal end 916. The tooth 906 allows for the dental tool 100*f* to push or pull on a device used in a dental procedure. For example, the dental tool 100*f* can pull on a first matrix on a mesial side of tooth. As another example, the dental tool 100*f* can push on a second matrix on a distal side of tooth, until the matrix contacts an adjacent tooth.

Looking to FIG. 20*b*, there is shown the slider 910 according to one embodiment. The slider 910 includes a projecting spring biased arm 920 that is configured to rest within the notches 912. For example, the arm 920 can be removably coupled to the notch, thereby the keeping the slider in place at the notch and keeping the first arm and the second arm in a temporarily fixed location.

The slider 910 is kept in place by the notches 912 of the dental tool 100*f*. The notches 912 are located on a side surface of the first arm and a side surface of the second arm. The notches 912 on each of the first and second arm are identical to one another. The slider 910 can be moved in a direction 914 towards the distal end of the dental tool or in an opposite direction to direction 914 towards a proximal end of the dental tool. Moving the slider 910 in these directions allows the user to easily adjust the first and second arms of the dental tool. Moving the slider in the direction ##adjusts the first and second arms closer to one another, thereby making the width between the first arm and the second arm smaller. A smaller width is advantageous when working with smaller teeth. Moving the slider in the opposite direction to direction 914 adjusts the first and second arms further apart from one another, thereby making the width between the first arm and the second arm larger. The larger width is advantageous when working with larger teeth. The adjustable grip and width on the dental tool allows for the dental tool to be used on teeth of various shapes and sizes, making the dental tool suitable for all patients teeth.

The slider is kept in place by the notches 912 located along a hollow strip 908 along the sides of the first and second arms. The notches 912 keep the slider from moving once it has been fixed into place. A user can adjust the slider forwards and backwards into one of the plurality of notches 912 to choose a desired location for the slider. The desired location of the slider is chosen based on the tooth that the user is working with and how far apart the first arm and second arm is desired to be. Once the slider has been adjusted to a particular spot by the user, it is desired by the user that the slider does not move. The notches keep the slider in place, thereby keeping the first arm and the second arm at a fixed distance from each other. The textured sides provide friction that prevents the slider form moving, and provides a location for the user to grab the dental tool.

A rounded end 918 joins the first arm 902 and the second arm 904. The rounded end 918, in addition to the slider fixed on the notches, also keeps the first arm and the second arm at a fixed distance. The rounded end 918 provides a location for the user to grip the dental tool without mistakenly adjusting the first arm, the second arm, or the slider. The welded end can be gripped to place the dental tool near a desired tooth after adjusting the slider to a location that caters to the width of the desired tooth. The end is a mechanism to link the first arm and the second arm together. For example, the first arm and the second arm can be soldered, glued, fused, or otherwise bonded to one another.

Referring now to FIGS. 21*a* and 21*b*, a dental tool 100*g* includes a knurled knob 1010. The knob 1010 can be moved forward and backward along the dental tool 100*g* for adjustability. Moving the knob 1010 forward allows the first arm 1002 and the second arm 1004 of the dental tool 100*g* to be narrower in size for narrower cavity preparations, while moving the knob 1010 backward allows the first arm 1002 and the second arm 1004 of the dental tool 100*g* to be wider in size for wider cavity preparations. Each of the first arm 1002 and the second arm 1004 includes a curved tooth 1006 at a distal end 1020. The tooth 1006 allows for the dental tool 100*g* to push or pull on a device used in a dental procedure. For example, the dental tool 100*g* can pull on a first matrix on a mesial side of tooth. As another example, the dental tool 100*g* can push on a second matrix on a distal side of tooth, until the matrix contacts an adjacent tooth.

The knob 1010 is kept in place by the notches 1008 of the dental tool 100*g*. The knob 1010 can have a textured top surface 1012. The textured top surface 1012 allows for the user to grip the top surface 1012 when adjusting or moving the knob 1010. The knob is attached to the first and second arms at a indent 1014. The indent 1014 allows the knob 1010 to be slideably attached to the first and second arms. The knob 1010 can be moved in a direction 1018 towards the distal end of the dental tool or in an opposite direction to direction 1018 towards a proximal end of the dental tool. Moving the know 1010 in these directions allows the user to easily adjust the first and second arms of the dental tool. Moving the knob in the direction 1018 adjusts the first and second arms closer to one another, thereby making the width between the first arm and the second arm smaller. A smaller width is advantageous when working with smaller teeth. Moving the knob in the opposite direction to direction 1018 adjusts the first and second arms further apart from one another, thereby making the width between the first arm and the second arm larger. The larger width is advantageous when working with larger teeth. The adjustable grip and width on the dental tool allows for the dental tool to be used on teeth of various shapes and sizes, making the dental tool suitable for all patients teeth.

The knob is kept in place by the notches 1008. The notches 1008 are located on a top surface of the first arm and the second arm. The notches on the first arm and the notches on the second arm are identical to one another. The notches keep the knob from moving once it has been fixed into place. The knob can be pushed in a direction 1022 or pulled in a direction 1024 to adjust the knob 1010 into one of the notches 1008. Once the knob has been adjusted to a particular spot by the user, it is desired by the user that the knob does not move. The notches keep the knob in place, thereby keeping the first arm and the second arm at a fixed distance from each other. The notches provide a temporarily fixed coupling mechanism that prevents the knob form moving, and provides a location for the user to grab the dental tool.

A rounded end 1016 joins the first arm 1002 and the second arm 1004. The rounded end 1016, in addition to the knob fixed by the notches, also keeps the first arm and the second arm at a fixed distance. The rounded end 1016 provides a location for the user to grip the dental tool without mistakenly adjusting the first arm, the second arm, or the knob. The rounded end 1016 can be gripped to place the dental tool near a desired tooth after adjusting the slider to a location that caters to the width of the desired tooth. The rounded end 1016 is a mechanism to link the first arm and the second arm together. For example, the first arm and the second arm can be soldered, glued, fused, or otherwise bonded to one another.

Referring now to FIGS. 22*a* and 22*b*, a dental tool 100*h* includes a knurled knob 2010. Controlled rotation on the knob 2010 allows for precise movement forward and backward along the dental tool. Rotating the knob 2010 in a first direction allows the first arm 2002 and the second arm 2004 of the dental tool 100*h* to be narrower in size for narrower cavity preparations, while rotating the knob in a second opposite direction allows the first arm 2002 and the second arm 2004 of the dental tool 100*h* to be wider in size for wider cavity preparations. Each of the first arm 2002 and the second arm 2004 includes a curved tooth 2006 at a distal end 2020. The tooth 2006 allows for the dental tool 100*h* to push or pull on a tooth. For example, the dental tool 100*h* can pull on a first matrix on a mesial side of tooth. As another example, the dental tool 100*h* can push on a second matrix on a distal side of tooth, until the matrix contacts an adjacent tooth.

The knob 2010 can be moved forward and backward along the dental tool 100*g* for adjustability. Moving the knob 2010 forward allows the first arm 2002 and the second arm 1004 of the dental tool 100*g* to be narrower in size for narrower cavity preparations, while moving the knob 2010 backward allows the first arm 2002 and the second arm 2004 of the dental tool 100*g* to be wider in size for wider cavity preparations. Each of the first arm 2002 and the second arm 2004 includes a curved tooth 2006 at a distal end 2020. The tooth 2006 allows for the dental tool 100*g* to push or pull on a tooth. For example, the dental tool 100*g* can pull on a first matrix on a mesial side of tooth. As another example, the dental tool 100*g* can push on a second matrix on a distal side of tooth, until the matrix contacts an adjacent tooth.

The knob 2010 is kept in place by the notches 2008 of the dental tool 100*g*. The knob 2010 can have a textured top surface 2012. The textured top surface 2012 allows for the user to grip the top surface 2012 when adjusting or moving the knob 2010. The knob is attached to the first and second arms at an indent 2014. The indent 2014 allows the knob to be slideably attached to the first and second arms. The knob 2010 can be moved in a direction 2018 towards the distal end of the dental tool or in an opposite direction to direction 2018 towards a proximal end of the dental tool. Moving the know 2010 in these directions allows the user to easily adjust the first and second arms of the dental tool. Moving the knob in the direction 2018 adjusts the first and second arms closer to one another, thereby making the width between the first arm and the second arm smaller. A smaller width is advantageous when working with smaller teeth. Moving the knob in the opposite direction to direction 2018 adjusts the first and second arms further apart from one another, thereby making the width between the first arm and the second arm larger. The larger width is advantageous when working with larger teeth. The adjustable grip and width on the dental tool allows for the dental tool to be used on teeth of various shapes and sizes, making the dental tool suitable for all patients teeth.

The knob is kept in place by the notches 2008. The notches 2008 are located on a top surface of the first arm and the second arm. The notches on the first arm and the notches on the second arm are identical to one another. The notches keep the knob from moving once it has been fixed into place. The knob can be pushed in a direction 2022 or pulled in a direction 2024 to adjust the knob 2010 into one of the notches 2008. Once the knob has been adjusted to a particular spot by the user, it is desired by the user that the knob does not move. The notches keep the knob in place, thereby keeping the first arm and the second arm at a fixed distance from each other. The notches provide a temporarily fixed coupling mechanism that prevents the knob form moving, and provides a location for the user to grab the dental tool.

A rounded end 2016 joins the first arm 2002 and the second arm 2004.

The rounded end 2016, in addition to the knob fixed by the notches, also keeps the first arm and the second arm at a fixed distance. The rounded end 2016 can have a hollow rounded end allowing the user to grip the end when using the dental tool 100*h*. The rounded end 2016 provides a location for the user to grip the dental tool without mistakenly adjusting the first arm, the second arm, or the knob. The rounded end 2016 can be gripped to place the dental tool near a desired tooth after adjusting the slider to a location that caters to the width of the desired tooth. The rounded end 2016 is a mechanism to link the first arm and the second arm together. For example, the first arm and the second arm can be soldered, glued, fused, or otherwise bonded to one another.

Referring now to FIGS. 23*a* to 23*d*, a dental tool 100*i* includes a slider 3010 and a ratchet interior 3008. The ratchet interior 3008 is connected to a ratchet button 3010 for sliding forward and backward. Moving the slider forward allows the first arm 3002 and the second arm 3004 of the dental tool 100*i* to be narrower in size for narrower cavity preparations, while moving the slider backward allows the first arm 3002 and the second arm 3004 of the dental tool 100*i* to be wider in size for wider cavity preparations.

Looking to FIG. 23*c*, the first arm and the second arm can be attached to one another at a welded end 3020, according to one embodiment. The welded end 3020 can be placed inside the rounded end 3012. Each of the first arm 3002 and the second arm 3004 includes a curved tooth 3006 at a distal end 3016. The tooth 3006 allows for the dental tool 100*i* to push or pull on a device used in a dental procedure. For example, the dental tool 100*i* can pull on a first matrix on a mesial side of tooth. As another example, the dental tool 100*i* can push on a second matrix on a distal side of tooth, until the matrix contacts an adjacent tooth.

The slider 3010 is kept in place by the ratchet interior 3008 of the dental tool 100*i*. The slider 3010 can be moved in a direction 3014 towards the distal end of the dental tool or in an opposite direction to direction 3014 towards a proximal end of the dental tool. Moving the slider 3010 in these directions allows the user to easily adjust the first and second arms of the dental tool. Moving the slider in the direction 3014 adjusts the first and second arms closer to one another, thereby making the width between the first arm and the second arm smaller. A smaller width is advantageous when working with smaller teeth. Moving the slider in the opposite direction to direction 3014 adjusts the first and second arms further apart from one another, thereby making the width between the first arm and the second arm larger. The larger width is advantageous when working with larger teeth. The adjustable grip and width on the dental tool allows for the dental tool to be used on teeth of various shapes and sizes, making the dental tool suitable for all patients teeth.

The slider is kept in place by the notches 3018*a* and 3018*b*. The notches can be configured on the first and second arms or the ratchet interior 3008, or both. The slider 3010 is moved forwards or backwards into one of the notches to be secured into a desired location by the user. The notches keep the slider from moving once it has been fixed into place. Once the slider has been adjusted to a particular spot by the user, it is desired by the user that the slider does not move. The notches keep the slider in place, thereby keeping the first arm and the second arm at a fixed distance from each other. The notches provide temporarily fixed location that prevents the slider form moving, and provides a location for the user to grab the dental tool.

Looking to FIG. 23*d*, there is shown an example slider 3010 according to one embodiment. The slider 3010 has a first arm 3022 and a second arm 3024. Each of the first arm 3022 and the second arm 3024 have a curve 3026 at a proximal end 3028. The curved end 3026 allows the slider to grip on the inside surface of the enclosed end 3012. This allows the slider to be kept in place inside the enclosed end. The slider also includes a top textured surface 3030. The textured surface 3030 provides additional friction for the user as the slider is moved forwards and backwards to adjust the first arm 3002 and the second arm 3004.

An enclosed end 3012 joins the first arm 3002 and the second arm 3004. The enclosed end 3012, in addition to the slider, also keeps the first arm and the second arm at a fixed distance. The end 3012 provides a location for the user to grip the dental tool without mistakenly adjusting the first arm, the second arm, or the slider. The end can be gripped to place the dental tool near a desired tooth after adjusting the slider to a location that caters to the width of the desired tooth. The welded end is a mechanism to link the first arm and the second arm together. For example, the first arm and the second arm can be soldered, glued, fused, or otherwise bonded to one another.

Referring now to FIGS. 24*a* and 24*b*, a dental tool 100*j* includes a slider 4010 along the dental tool. The slider 111*j* is connected to a notch 4012 along the dental tool 100*j* for moving the slider forward and backward. Moving the slider forward allows the first arm 4002 and the second arm 4004 of the dental tool 100*j* to be narrower in size for narrower cavity preparations, while moving the slider backward allows the first arm 4002 and the second arm 4004 of the dental tool 100*j* to be wider in size for wider cavity preparations. Each of the first arm 4002 and the second arm 4004 includes a curved tooth 4006 at a distal end 4016. The tooth 4006 allows for the dental tool 100*j* to push or pull on a device used in a dental procedure. For example, the dental tool 100*j* can pull on a first matrix on a mesial side of tooth. As another example, the dental tool 100*j* can push on a second matrix on a distal side of tooth, until the matrix contacts an adjacent tooth.

The slider 4010 is kept in place by notch 4012 located on a side of the dental tool 100*j*. The slider 4010 can be moved in a direction 4018 towards the proximal end of the dental tool or in an opposite direction to direction 4018 towards a distal end of the dental tool. Moving the slider 4010 in these directions allows the user to easily adjust the separation distance between the first and second arms of the dental tool. Moving the slider in the direction 4018 adjusts the first and second arms closer to one another, thereby making the width between the first arm and the second arm smaller. A smaller width is advantageous when working with smaller teeth. Moving the slider in the opposite direction to direction 4018 adjusts the first and second arms further apart from one another, thereby making the width between the first arm and the second arm larger. The larger width is advantageous when working with larger teeth. The adjustable grip and width on the dental tool allows for the dental tool to be used on teeth of various shapes and sizes, making the dental tool suitable for all patients teeth.

The slider can also include a textured surface 4008. The textured surface 4008 provides a surface for the user to move the slider forwards or backwards to adjust the first and second arms. The slider is kept in place by the notch 4012. The notch keeps the slider from moving once it has been fixed into place. Once the slider has been adjusted to a particular spot by the user, it is desired by the user that the slider does not move. The notch keeps the slider in place, thereby keeping the first arm and the second arm at a fixed distance from each other.

Looking to FIG. 24*b*, a first half 4014*a* and a second half 4014*b* of the rounded end 4014 is shown according to one embodiment. The first half or the second half can have the notch 4012. The rounded end 4014 can have a hollow inside, as shown in FIG. 24*b*.

The rounded end 4014 joins the first arm 4002 and the second arm 4004. The rounded end 4014, in addition to the slider fixed by the notch, also keeps the first arm and the second arm at a fixed distance. The rounded end 4014 provides a location for the user to grip the dental tool without mistakenly adjusting the first arm, the second arm, or the slider. The rounded end can be gripped to place the dental tool near a desired tooth after adjusting the slider to a location that caters to the width of the desired tooth. The rounded end is a mechanism to link the first arm and the second arm together. For example, the first arm and the second arm can be soldered, glued, fused, or otherwise bonded to one another.

Referring now to FIGS. 25*a* and 25*b*, a dental tool 100*k* includes a rotating middle portion 5012 for adjustability. The dental tool 100*k* is similar in function and structure to the dental tool shown in FIG. 17*a*. The rotation allows for making the dental tool wider or narrower according to the size of the cavity. Rotating the middle section in a first direction allows the first arm 5002 and the second arm 5004 of the dental tool 100*k* to be narrower in size for narrower cavity preparations, while rotating the middle section in a second opposite direction allows the first arm 5002 and the second arm 5004 of the dental tool 100*k* to be wider in size for wider cavity preparations. Each of the first arm 5002 and the second arm 5004 includes a curved tooth 5006 at a distal end 5020. The dental tool also includes a wedge 5010 that is connected to the rotating portion 5012 and the rounded end 5016 through the coupling of a extruding arm 5018 connected to the sheath 5014 and inserted through the hold 5008.

Referring now to FIGS. 26*a* and 26*b*, a dental tool 100*l* includes a screw knob 6010. The screw knob is inserted into a metal sheet in the center of the dental tool 100*l*. Rotation of the screw knob correlated to adjustability of the dental tool being narrower or wider. Rotating the knob in a first direction allows the first arm 6002 and the second arm 6004 of the dental tool 100*l* to be narrower in size for narrower cavity preparations, while rotating the knob in a second opposite direction allows the first arm 6002 and the second arm 6004 of the dental tool 100*l* to be wider in size for wider cavity preparations. Each of the first arm 6002 and the second arm 6004 includes a curved tooth 6006 at a distal end 6008. The tooth 6006 allows for the dental tool 100*l* to push or pull on a device used in a dental procedure. For example, the dental tool 100*l* can pull on a first matrix on a mesial side of tooth. As another example, the dental tool 100*l* can push on a second matrix on a distal side of tooth, until the matrix contacts an adjacent tooth.

Looking at FIG. 26*b*, the knob 6010 is coupled to the rounded end 6012 by an extruding arms 6016 and 6018. The arm 6018 is inserted into the hole of 6020 inside the rounded end 6012 to be coupled to the rounded end 6012. The knob 6010 can be rotated in a direction 6014 or rotated in an opposite direction to direction 6014. Rotating the knob in these directions allows the user to easily adjust the first and second arms of the dental tool. Rotating the knob in the direction 6014 adjusts the first and second arms closer to one another, thereby making the width between the first arm and the second arm smaller. A smaller width is advantageous when working with smaller teeth. Rotating the knob in the opposite direction to direction 6014 adjusts the first and second arms further apart from one another, thereby making the width between the first arm and the second arm larger. The larger width is advantageous when working with larger teeth. The adjustable grip and width on the dental tool allows for the dental tool to be used on teeth of various shapes and sizes, making the dental tool suitable for all patients teeth.

Once the knob has been adjusted to a particular spot by the user, it is desired by the user that the knob does not move. The notch keeps the knob in place, thereby keeping the first arm and the second arm at a fixed distance from each other.

A rounded end 6012 joins the first arm 6002 and the second arm 6004. The rounded end 6012, in addition to the knob, also keeps the first arm and the second arm at a fixed distance. The rounded end provides a location for the user to grip the dental tool without mistakenly adjusting the first arm, the second arm, or the slider. The rounded end can be gripped to place the dental tool near a desired tooth after adjusting the slider to a location that caters to the width of the desired tooth. The welded end is a mechanism to link the first arm and the second arm together. For example, the first arm and the second arm can be soldered, glued, fused, or otherwise bonded to one another.

Referring now to FIGS. 27*a* and 27*b*, a dental tool 100*m* includes a rotating knurled tightener 7010. The tightener 7010 can be rotated to adjust the dental tool to be narrower or wider. Rotating the tightener in a first direction allows the first arm 7002 and the second arm 7004 of the dental tool 100*m* to be narrower in size for narrower cavity preparations, while rotating the tightener in a second opposite direction allows the first arm 7002 and the second arm 7004 of the dental tool 100*m* to be wider in size for narrower cavity preparations. Each of the first arm 7002 and the second arm 7004 includes a curved tooth 7006 at a distal end 7008. The tooth 7006 allows for the dental tool 100*m* to push or pull on a tooth. For example, the dental tool 100*m* can pull on a first matrix on a mesial side of tooth. As another example, the dental tool 100*m* can push on a second matrix on a distal side of tooth, until the matrix contacts an adjacent tooth.

The tightener 7010 couples the rounded end 7012 to the first and second arms via a threaded insert 7016. The threaded insert 7016 is connected to the rounded end 7012 and can be inserted into the tightener 7010 at one end and the first and second arms are inserted to the tightener 7010 at the opposite end. The tightener 7010 can be rotated in a direction 7014 or in an opposite direction to direction 7014. Rotating the tightener in these directions allows the user to easily adjust the separation distance between the first and second arms of the dental tool. Rotating the tightener in the direction 7014 adjusts the first and second arms closer to one another, thereby making the width between the first arm and the second arm smaller. A smaller width is advantageous when working with smaller teeth. Rotating the tightener in the opposite direction to direction 7014 adjusts the first and second arms further apart from one another, thereby making the width between the first arm and the second arm larger. The larger width is advantageous when working with larger teeth. The adjustable grip and width on the dental tool allows for the dental tool to be used on teeth of various shapes and sizes, making the dental tool suitable for all patients teeth. Once the tightener has been adjusted to a particular spot by the user, it is desired by the user that the tightener does not move.

Thus, the invention provides methods and devices for interproximal dental restoration.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for the restoration of a first tooth having an original shape including a top surface and an interproximal surface facing an adjacent second tooth, the method comprising:

(a) removing a portion of the top surface of the first tooth and a portion of the interproximal surface of the first tooth to form a hollow cavity preparation, the cavity preparation extending from the top surface to the interproximal surface of the first tooth;

(b) surrounding the removed portion of the interproximal surface of the first tooth with a matrix, the matrix being positioned within an interproximal space between the first tooth and the second tooth;

(c) moving the matrix away from the hollow cavity preparation toward the second tooth using a first arm and a second arm of a dental tool that simultaneously contact an inner surface of the matrix, the inner surface of the matrix being located within the interproximal space between the first tooth and the second tooth, the dental tool comprising:

the first arm and the second arm connected at a proximal end of the first arm and the second arm, the first arm terminating in a first distal tooth, and the second arm terminating in a second distal tooth; and an adjustment mechanism for holding the first distal tooth and the second distal tooth in at least a first spaced relationship and a second spaced relationship different from the first spaced relationship;

(d) bonding a section of the matrix to the first tooth;

(e) injecting a light-curable composite resin into the cavity preparation; and (f) light curing the composite resin contained in the cavity preparation.

2. The method of claim 1 wherein:

step (c) comprises moving the matrix away from the hollow cavity preparation toward the second tooth until the matrix contacts the second tooth.

3. The method of claim 1 wherein:

step (d) further comprises bonding a second section of the matrix to the first tooth.

4. The method of claim 3 wherein:

the section of the matrix comprises a first tab extending away from an edge of the matrix, and the second section of the matrix comprises a second tab extending away from the edge of the matrix.

5. The method of claim 4 wherein:

the first tab is on a lingual side of the first tooth when the matrix surrounds the removed portion of the interproximal surface, and the second tab is on a buccal side of the first tooth when the matrix surrounds the removed portion of the interproximal surface.

6. The method of claim 5 wherein:

step (d) further comprises bonding a third section of the matrix to the first tooth.

7. The method of claim 6 wherein:

the third section of the matrix is on an interproximal side of the first tooth when the matrix surrounds the removed portion of the interproximal surface.

8. The method of claim 1 wherein:

step (c) comprises moving the matrix away from the hollow cavity preparation toward the second tooth using a dental tool.

9. The method of claim 1 wherein:

step (e) further comprises placing a light-curable resin tooth bonding agent into the cavity preparation before injecting the light-curable composite resin into the cavity preparation.

10. The method of claim 1 wherein:

step (e) further comprises extruding a light-curable paste composite resin into the composite resin.

11. The method of claim 1 wherein step (a) comprises:

a pre-wedging step including inserting a wedge pre-operatively between the interproximal surface of the first tooth and an interproximal surface of the second tooth.

12. The method of claim 1 wherein:

further composite resin is not added after step (e) such that the method produces a single cured layer of composite resin.

13. The method of claim 12 wherein:

the cured layer of composite resin is seamless.

14. The method of claim 1 wherein:

step (d) comprises bonding a section of the matrix to the first tooth using a cured amount of composite resin.

15. The method of claim 1 wherein:

step (c) occurs before step (d).

16. The method of claim 1 wherein:

step (d) occurs before step (c).

17. The method of claim 1 wherein the dental tool comprises:

a biasing spring coupled to the first arm and the second arm, the biasing spring having a first position in which the first distal tooth and the second distal tooth are in the first spaced relationship, and the biasing spring having a second position in which the first distal tooth and the second distal tooth are in the second spaced relationship.

18. The method of claim 1 wherein:

step (c) further comprises spreading open the matrix buccally and lingually to expand the matrix buccally and lingually.

19. A method for the restoration of a first tooth having an original shape including a top surface and an interproximal surface facing an adjacent second tooth, the method comprising:

(a) removing a portion of the top surface of the first tooth and a portion of the interproximal surface of the first tooth to form a hollow cavity preparation, the cavity preparation extending from the top surface to the interproximal surface of the first tooth;

(b) surrounding the removed portion of the interproximal surface of the first tooth with a matrix, wherein the matrix includes a cutaway, the cutaway directed into an edge of the matrix;

(c) moving the matrix away from the hollow cavity preparation toward the second tooth using a first arm and a second arm of a dental tool that simultaneously contact an inner surface of the matrix, the inner surface of the matrix being located within an interproximal space between the first tooth and the second tooth, the dental tool comprising:

the first arm and the second arm connected at a proximal end of the first arm and the second arm, the first arm terminating in a first distal tooth, and the second arm terminating in a second distal tooth; and an adjustment mechanism for holding the first distal tooth and the second distal tooth in at least a first spaced relationship and a second spaced relationship different from the first spaced relationship;

(d) bonding a section of the matrix at the cutaway to the first tooth by injecting a composite resin through the cutaway;

(e) injecting a light-curable composite resin into the cavity preparation; and (f) light curing the composite resin contained in the cavity preparation.

20. The method of claim 19 wherein:

step (c) comprises moving the matrix away from the hollow cavity preparation toward the second tooth using a dental tool.

21. The method of claim 19 wherein:

step (c) comprises moving the matrix away from the hollow cavity preparation toward the second tooth until the matrix contacts the second tooth.

22. The method of claim 19 wherein:

the cutaway is a first cutaway and the matrix includes a second cutaway; and step (d) further comprises bonding a second section of the matrix at the second cutaway to the first tooth.

23. The method of claim 22 wherein:

the section of the matrix is a first section of the matrix;

the first section of the matrix comprises a first flange extending away from a first side edge of the matrix, and a second section of the matrix comprises a second flange extending away from a second side edge of the matrix.

24. The method of claim 23 wherein:

the first flange is on a lingual side of the first tooth when the matrix surrounds the removed portion of the interproximal surface, and the second flange is on a buccal side of the first tooth when the matrix surrounds the removed portion of the interproximal surface.

25. The method of claim 19 wherein:

step (c) comprises moving the matrix away from the hollow cavity preparation toward the second tooth using a dental tool.

26. The method of claim 19 wherein:

step (e) further comprises placing a light-curable resin tooth bonding agent into the cavity preparation before injecting the light-curable composite resin into the cavity preparation.

27. The method of claim 19 wherein:

step (e) further comprises extruding a light-curable paste composite resin into the composite resin.

28. The method of claim 19 wherein step (a) comprises:

a pre-wedging step including inserting a wedge pre-operatively between the interproximal surface of the first tooth and an interproximal surface of the second tooth.

29. The method of claim 19 wherein:

further composite resin is not added after step (e) such that the method produces a single cured layer of composite resin.

30. The method of claim 29 wherein:

the cured layer of composite resin is seamless.

31. The method of claim 19 wherein:

step (d) comprises bonding a section of the matrix to the first tooth using a cured amount of composite resin.

32. The method of claim 19 wherein:

step (c) occurs before step (d).

33. The method of claim 19 wherein:

step (d) occurs before step (c).

34. The method of claim 19 wherein:

step (c) further comprises spreading open the matrix buccally and lingually to expand the matrix buccally and lingually.

35. A method for the restoration of a first tooth having a top surface and an interproximal surface facing an adjacent second tooth, the method comprising:

(a) removing a portion of the top surface of the first tooth and a portion of the interproximal surface of the first tooth to form a hollow cavity preparation, the hollow cavity preparation extending from the top surface to the interproximal surface of the first tooth, and the hollow cavity preparation being saucer shaped when viewed from a top view;

(b) surrounding the entire removed portion of the interproximal surface of the first tooth with a matrix, the matrix being positioned within an interproximal space between the first tooth and the second tooth;

(c) moving the matrix away from the hollow cavity preparation toward the second tooth using a first arm and a second arm of a dental tool that simultaneously contact an inner surface of the matrix, the inner surface of the matrix being located within the interproximal space between the first tooth and the second tooth, the dental tool comprising:

the first arm and the second arm connected at a proximal end of the first arm and the second arm, the first arm terminating in a first distal tooth, and the second arm terminating in a second distal tooth; and an adjustment mechanism for holding the first distal tooth and the second distal tooth in at least a first spaced relationship and a second spaced relationship different from the first spaced relationship; and (d) bonding a portion of the matrix to the first tooth.

* * * * *